United States Patent
Chang et al.

(10) Patent No.: US 7,471,365 B2
(45) Date of Patent: Dec. 30, 2008

(54) LIQUID CRYSTAL DISPLAY HAVING PARTICULAR TILT DIRECTION DETERMINING MEMBERS

(75) Inventors: Hak-Sun Chang, Seoul (KR); Ji-Won Sohn, Seoul (KR); Nak-Cho Choi, Seoul (KR); Hyun-Wuk Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 677 days.

(21) Appl. No.: 11/206,032

(22) Filed: Aug. 18, 2005

(65) Prior Publication Data

US 2006/0038952 A1  Feb. 23, 2006

(30) Foreign Application Priority Data

Aug. 18, 2004  (KR) .................. 10-2004-0064984

(51) Int. Cl.
*G02F 1/1343* (2006.01)
(52) U.S. Cl. .................. 349/139; 349/144; 349/146
(58) Field of Classification Search ................ 349/139, 349/144, 146, 130
See application file for complete search history.

(56) References Cited

U.S. PATENT DOCUMENTS

| | | | |
|---|---|---|---|
| 6,462,798 B1 | 10/2002 | Kim et al. | |
| 6,940,573 B2 * | 9/2005 | Um et al. | 349/129 |
| 7,019,806 B2 * | 3/2006 | Um et al. | 349/129 |
| 7,110,075 B2 * | 9/2006 | Tak et al. | 349/129 |
| 7,113,233 B2 * | 9/2006 | Lyu | 349/38 |
| 7,151,279 B2 * | 12/2006 | Jun et al. | 257/72 |

FOREIGN PATENT DOCUMENTS

| | | |
|---|---|---|
| JP | 2001222010 | 8/2001 |
| JP | 2001324715 | 11/2001 |
| JP | 2002098966 | 4/2002 |
| JP | 2002372715 | 12/2002 |
| JP | 2003043488 | 2/2003 |
| JP | 2004102238 | 4/2004 |
| KR | 100283511 | 12/2000 |
| KR | 1020020000662 | 1/2002 |
| KR | 1020020010214 | 2/2002 |
| KR | 1020020019405 | 3/2002 |
| KR | 1020030078355 | 10/2003 |
| KR | 1020040021379 | 3/2004 |
| KR | 1020040021380 | 3/2004 |

* cited by examiner

*Primary Examiner*—Mike Qi
(74) *Attorney, Agent, or Firm*—Cantor Colburn LLP

(57) ABSTRACT

A liquid crystal display is provided, which includes: a first substrate; a first signal line disposed on the first substrate; a second signal line disposed on the first substrate and intersecting the first signal line; a thin film transistor coupled with the first and the second signal lines; a pixel electrode coupled with the thin film transistor; a second substrate facing the first substrate; a common electrode arranged on the second substrate; a liquid crystal layer arranged between the first substrate and the second substrate; a first tilt direction determining member arranged on the first substrate; and a second tilt direction determining member arranged on the first substrate, wherein the first tilt direction determining member is about 15 microns to about 20 microns apart from the second tilt direction determining member.

20 Claims, 19 Drawing Sheets

LIQUID CRYSTAL DISPLAY HAVING PARTICULAR TILT DIRECTION DETERMINING MEMBERS

CROSS REFERENCE TO RELATED APPLICATION

This application claims priority to and the benefit of Korean Patent Application No. 10-2004-0064984, filed on Aug. 18, 2004, which is hereby incorporated by reference for all purposes as if fully set forth herein.

BACKGROUND OF THE INVENTION

1. Field of the Invention

The present invention relates to a liquid crystal display that reduces a response time for obtaining a desired luminance.

2. Description of Related Art

A liquid crystal display (LCD) includes a pair of panels including a pixel electrode and a common electrode and a liquid crystal (LC) layer interposed between the panels and having dielectric anisotropy. The pixel electrode is arranged in a matrix and connected to switching elements, such as thin film transistors (TFTs). The pixel electrode is supplied with data voltages through the TFTs, e.g., row by row. The common electrode is arranged on an entire surface of a panel. The pixel electrode, the common electrode, and the LC layer disposed therebetween form a LC capacitor. The LC capacitor and the switching element are basic elements of the pixel.

The LCD generates an electric field in the LC layer when a voltage is applied to the electrodes. Desired images are obtained by controlling a strength of the electric field such that a transmittance of light that is incident upon the LC layer varies.

Among the LCDs, a vertical alignment (VA) mode LCD, which aligns LC molecules such that the long axes of the LC molecules are perpendicular to the panels in absence of an electric field, is discussed herein because the VA mode LCD has a high contrast ratio and wide viewing angle.

The viewing angle of the VA mode LCD may be realized by forming cutouts in the field-generating electrodes and forming protrusions on the field-generating electrodes. The cutouts and the protrusions affect the tilt directions of the LC molecules.

The response time of the liquid crystal is important because an increased size and the resolution of the LCD display device requires a faster response time than is currently being provided.

In detail, it takes longer for a pixel to reach a desired luminance when the response time of the LC is slow. The time for obtaining the desired luminance depends on a difference between a target voltage for giving the desired luminance and a previously charged voltage across the LC capacitor of the pixel. The pixel may not reach the desired luminance for a given time when the voltage difference is large.

To solve the above identified problem, dynamic capacitance compensation (DCC) may be used. DCC improves the response time of the LC without changing the characteristics of the LC. The DCC applies a higher voltage than the target voltage to the LC capacitor to reduce the time for pixel to reach a desired luminance.

However, applying a high voltage to the LC molecules in a cutout-type VA mode LCD causes them to be partially out of order. As such, the response time may not be reduced and the display characteristics of the LCD may deteriorate.

Accordingly, the LC molecules should be pre-tilted before applying the high voltage. For example, one conventional pre-tilting technique is performed by comparing image signals of three successive frames, however, this requires that the number of frame memories be increased, which increases the cost and delays the time for displaying an image. Another conventional pre-tilting technique deforms the pixel structure of the LCD, which decreases the contrast ratio and complicates the manufacturing process.

SUMMARY OF THE INVENTION

The invention provides a liquid crystal display that reduces a response time for obtaining a desired luminance.

Additional features of the invention will be set forth in the description which follows, and in part will be apparent from the description, or may be learned by practice of the invention.

The present invention discloses a liquid crystal display (LCD) including a first substrate; a first signal line arranged on the first substrate; a second signal line arranged on the first substrate and intersecting the first signal line; a thin film transistor coupled with the first signal line and the second signal line; a pixel electrode coupled with the thin film transistor; a second substrate facing the first substrate; a common electrode arranged on the second substrate; a liquid crystal layer arranged between the first substrate and the second substrate; a first tilt direction determining member and a second tilt direction determining member arranged on the first substrate; wherein the first tilt direction determining member is about 15 microns to about 20 microns apart from the second tilt direction determining member.

The present invention also discloses a liquid crystal display (LCD), including a first substrate; a gate line arranged on the first substrate; a gate insulating layer arranged on the gate line; a semiconductor layer arranged on the gate insulating layer; a data line arranged on the gate insulating layer, the data line including a portion arranged on the semiconductor layer; a drain electrode arranged on the semiconductor and separated from the data line; a pixel electrode coupled with the drain electrode, the pixel electrode having a first cutout; a second substrate facing the first substrate; and a common electrode arranged on the second substrate, the common electrode having a second cutout, wherein the first cutout is about 15 microns to about 20 microns apart from the second cutout.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF ILLUSTRATED EMBODIMENTS

Figure 1:
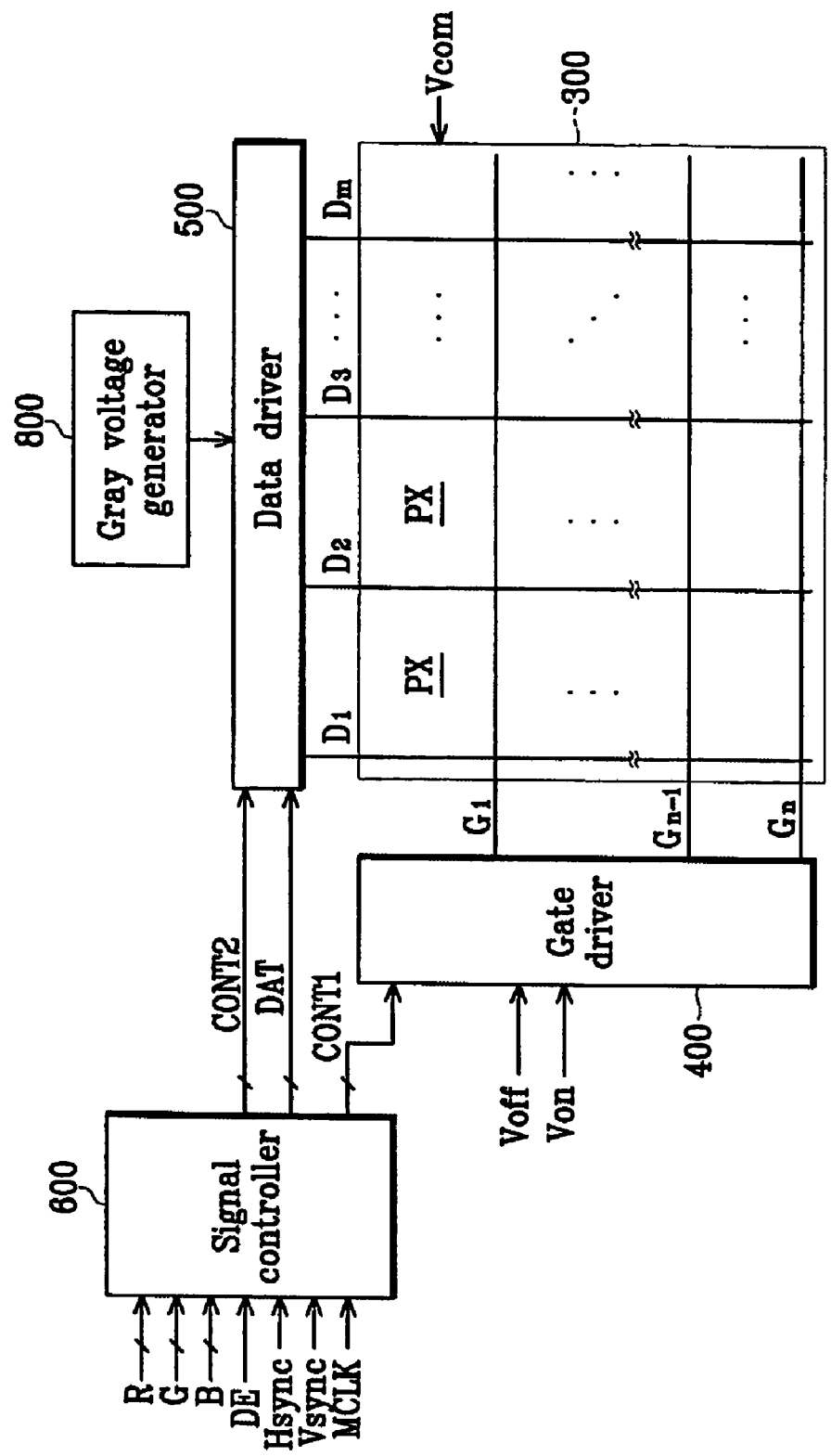
FIG. 1 is a block diagram of an LCD according to an embodiment of the invention.

The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

A liquid crystal display according to an embodiment of the present invention is described below with reference to FIG. 1 and FIG. 2.

Figure 2:
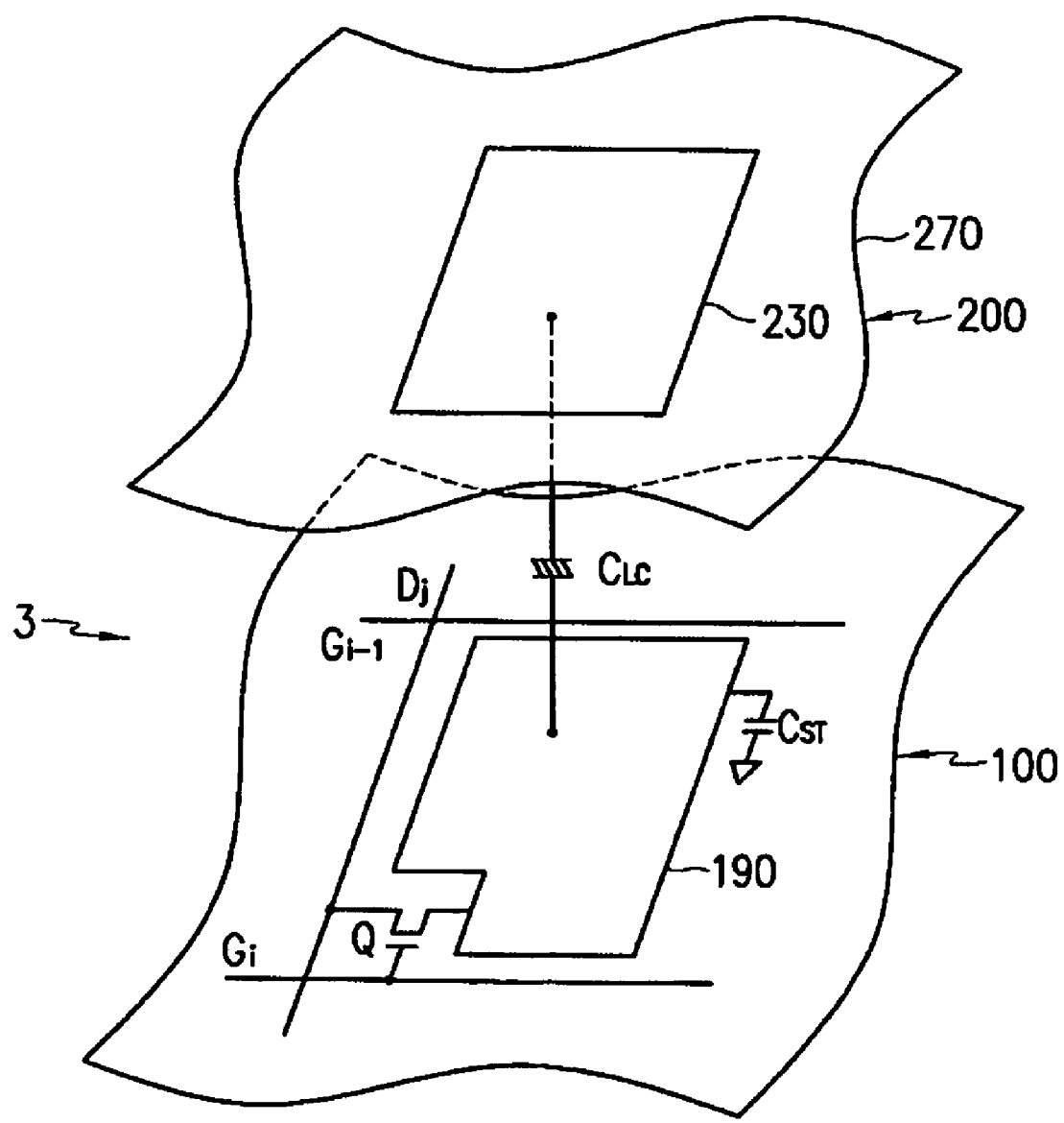
FIG. 2 is an equivalent circuit diagram of a pixel of an LCD according to an embodiment of the invention.

FIG. 1 is a block diagram of an LCD and FIG. 2 is an equivalent circuit diagram of a pixel of an LCD.

Referring to FIG. 1, an LCD includes a liquid crystal (LC) panel assembly 300, a gate driver 400 and a data driver 500 that are coupled with the panel assembly 300, a gray voltage generator 800 that is coupled with data driver 500, and a signal controller 600 controlling all of the above elements.

The panel assembly 300 includes a plurality of signal lines $G_1$-$G_n$ and $D_1$-$D_m$ and a plurality of pixels PX connected, e.g., coupled, with the signal lines $G_1$-$G_n$ and $D_1$-$D_m$ and arranged substantially in a matrix. As shown in FIG. 2, the panel assembly 300 includes a lower panel 100 and an upper panel 200 facing each other and a LC layer 3 arranged therebetween.

The signal lines include a plurality of gate lines $G_1$-$G_n$ transmitting gate signals ("scanning signals") and a plurality of data lines $D_1$-$D_m$ transmitting data signals. The gate lines $G_1$-$G_n$ extend substantially in a row direction and are substantially parallel to each other. The data lines $D_1$-$D_m$ extend substantially in a column direction and are substantially parallel to each other.

Referring to FIG. 2, each pixel PX, for example, is connected, e.g., coupled, with the i-th gate line $G_i$ (i=1, 2, . . . , n) and the j-th data line $D_j$ (j=1, 2, . . . , m) and includes a switching element Q connected, e.g., coupled, with the signal lines $G_i$ and $D_j$, and a LC capacitor $C_{LC}$ and a storage capacitor $C_{ST}$ that are connected, e.g., coupled, with the switching element Q. The storage capacitor $C_{ST}$ may be omitted as necessary.

The switching element Q is arranged on the lower panel 100 and the switching element includes three terminals, i.e., a control terminal connected, e.g., coupled, with the gate line $G_i$, an input terminal connected, e.g., coupled, with the data line $D_j$, and an output terminal connected, e.g., coupled, with the LC capacitor $C_{LC}$ and the storage capacitor $C_{ST}$.

The LC capacitor $C_{LC}$ includes a pixel electrode 190 arranged on the lower panel 100 and a common electrode 270 arranged on the upper panel 200. The LC layer 3 arranged between the pixel electrode 190 and the common electrode 270 operate as a dielectric of the LC capacitor $C_{LC}$. The pixel electrode 190 is connected, e.g., coupled, with the switching element Qs1, and the common electrode 270 is supplied with a common voltage Vcom and covers an entire surface of the upper panel 200. Unlike the embodiment shown in FIG. 2, the common electrode 270 may be arranged on the lower panel 100, and at least one of the pixel electrode 190 and the common electrode 270 may have a bar-like shape or a stripe-like shape.

The storage capacitor $C_{ST}$ may be an auxiliary capacitor for the LC capacitor $C_{LC}$. The storage capacitor $C_{ST}$ includes the pixel electrode 190 and a separate signal line, which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For displaying color, each pixel may uniquely represent a color, e.g., one of primary colors via a spatial division technique or each pixel may sequentially represent one of the primary colors in turn via a temporal division technique such that the spatial or the temporal sum of the primary colors is recognized as a desired color. For example, a set of the primary colors includes red, green, and blue colors. FIG. 2 shows an example of the spatial division wherein each pixel includes a color filter 230 representing one of the primary colors at an area of the upper panel 200 facing the pixel electrode 190. Alternatively, the color filter 230 may be arranged on or under the pixel electrode 190 on the lower panel 100.

One or more polarizers (not shown) may be attached with the panel assembly 300.

The LC panel assemblies according to embodiments of the invention are described below in detail with reference to FIGS. 3, 4, 5, 6, 7, 8A and 8B.

Figure 3:
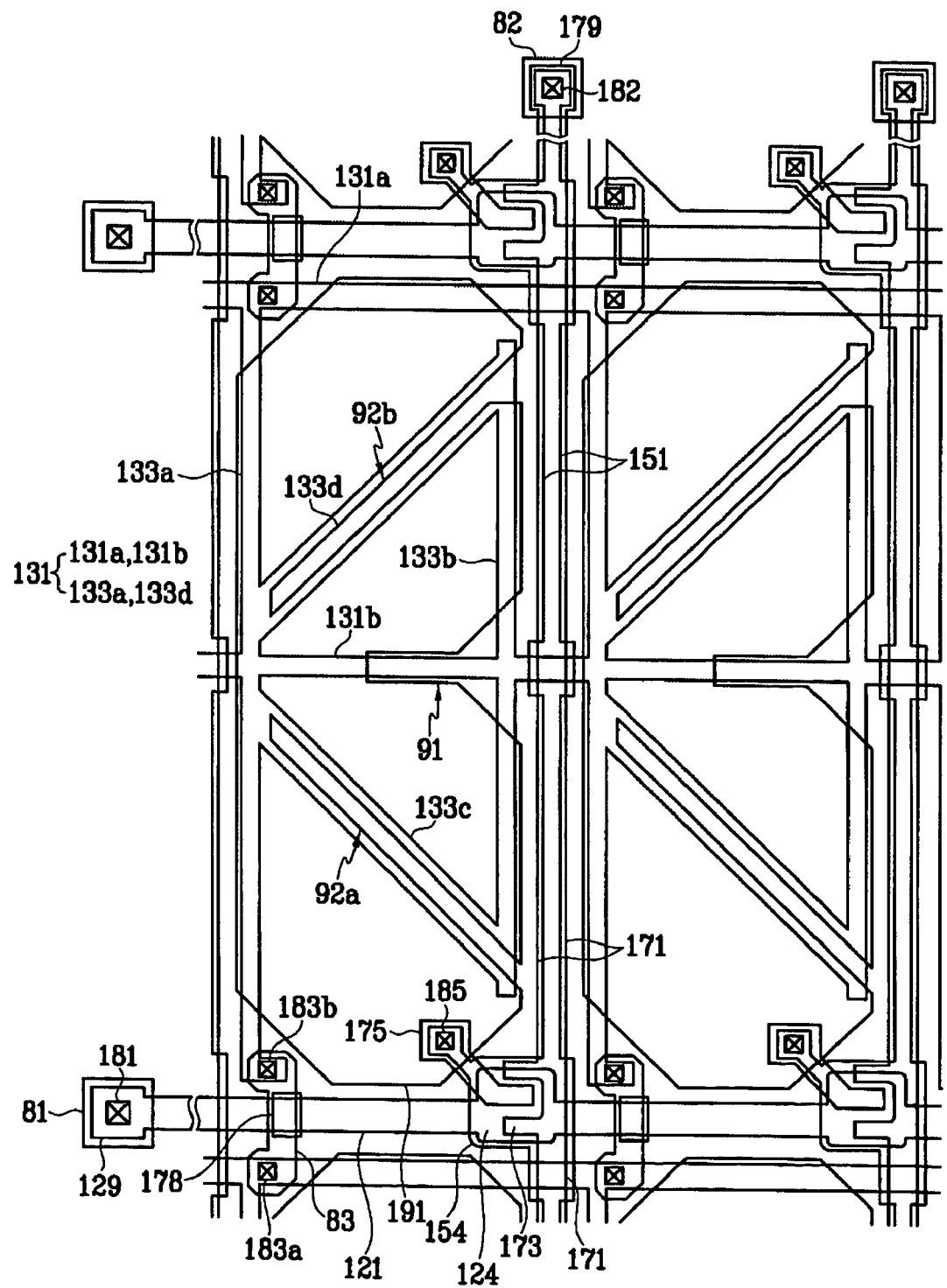
FIG. 3 is a layout view of a TFT array panel for an LCD according to an embodiment of the invention.
Figure 4:
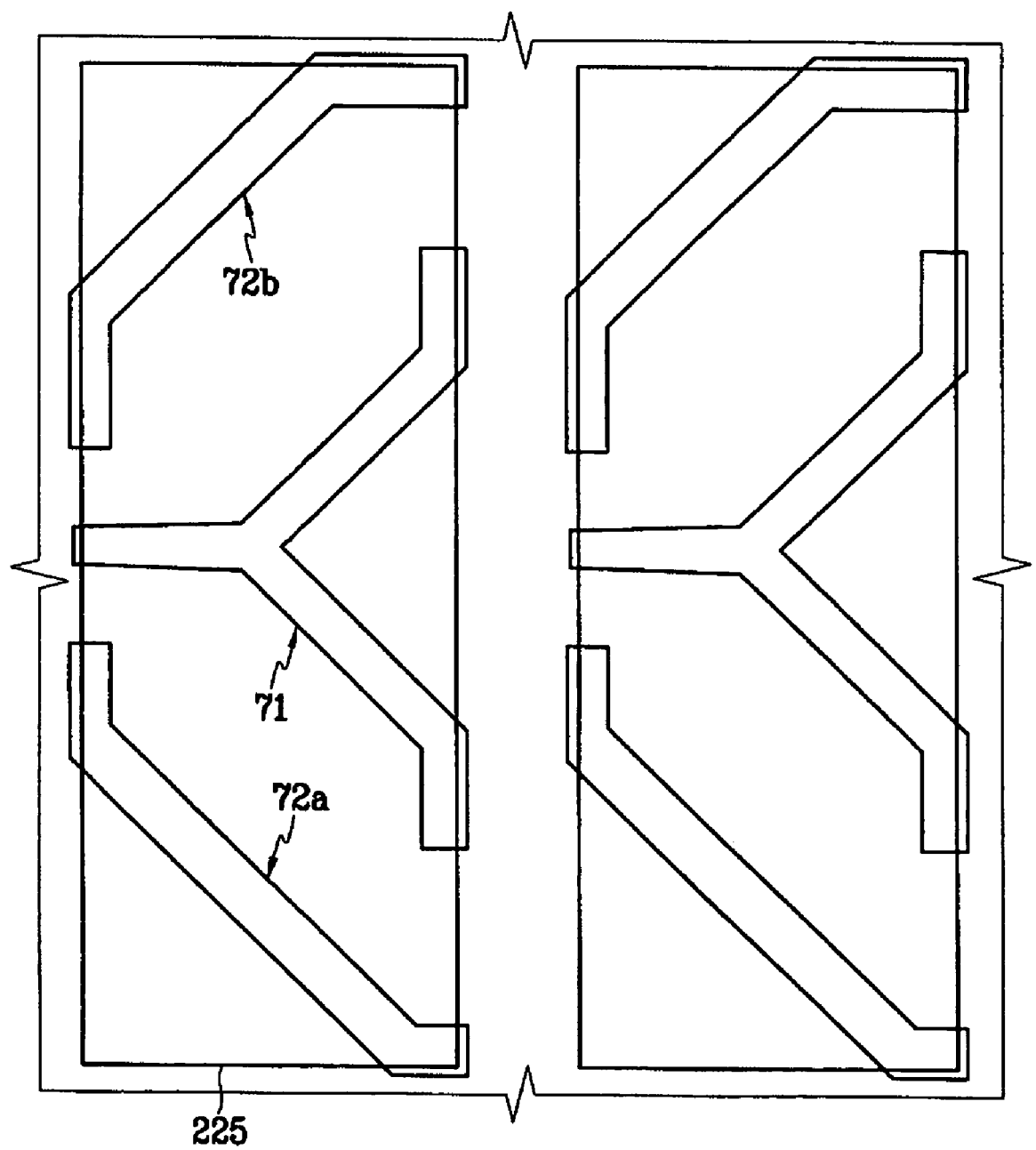
FIG. 4 is a layout view of a common electrode panel of an LC panel assembly according to an embodiment of the invention.
Figure 5:
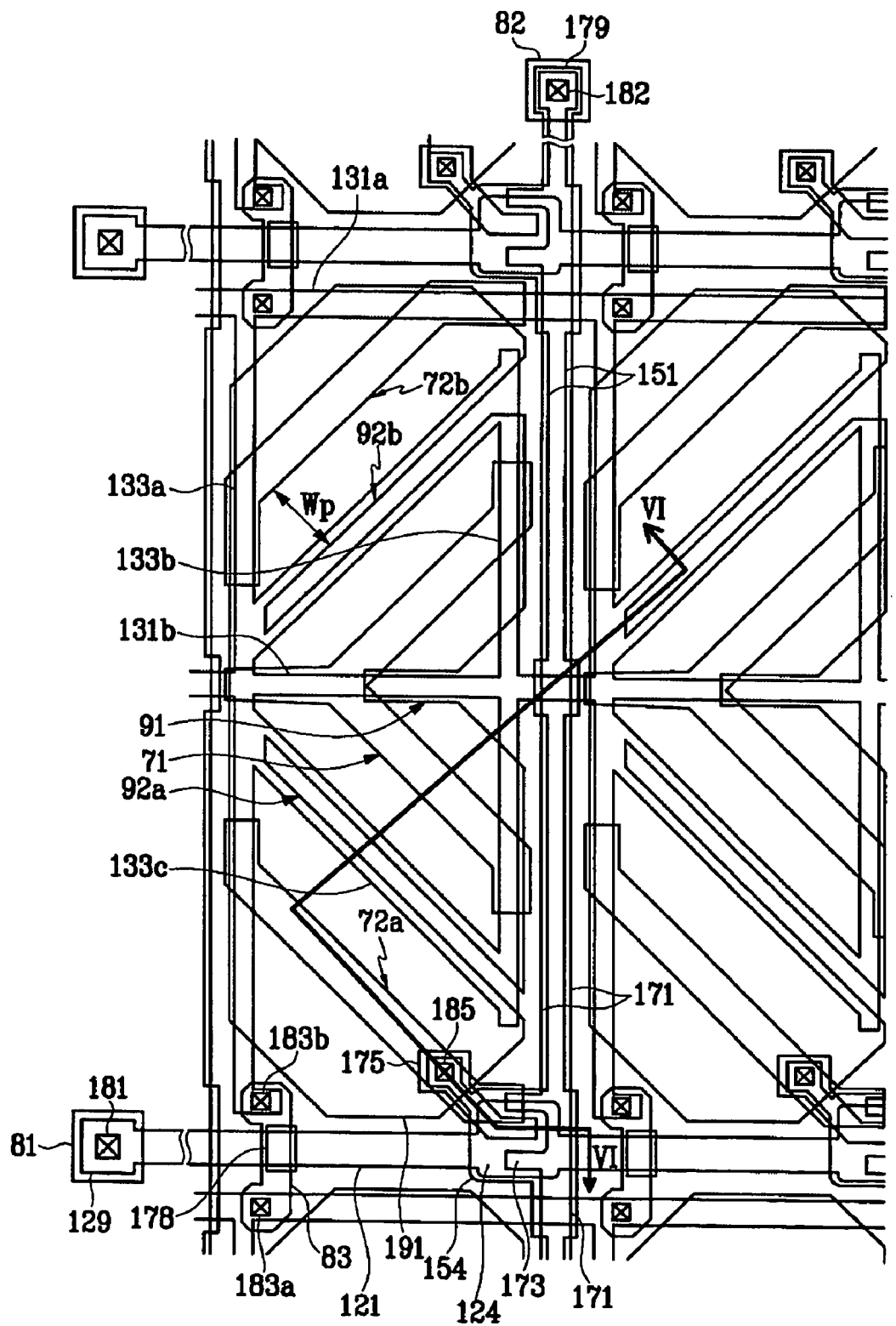
FIG. 5 is a layout view of an LC panel assembly including the TFT array panel shown in FIG. 3 and the common electrode panel shown in FIG. 4.
Figure 6:
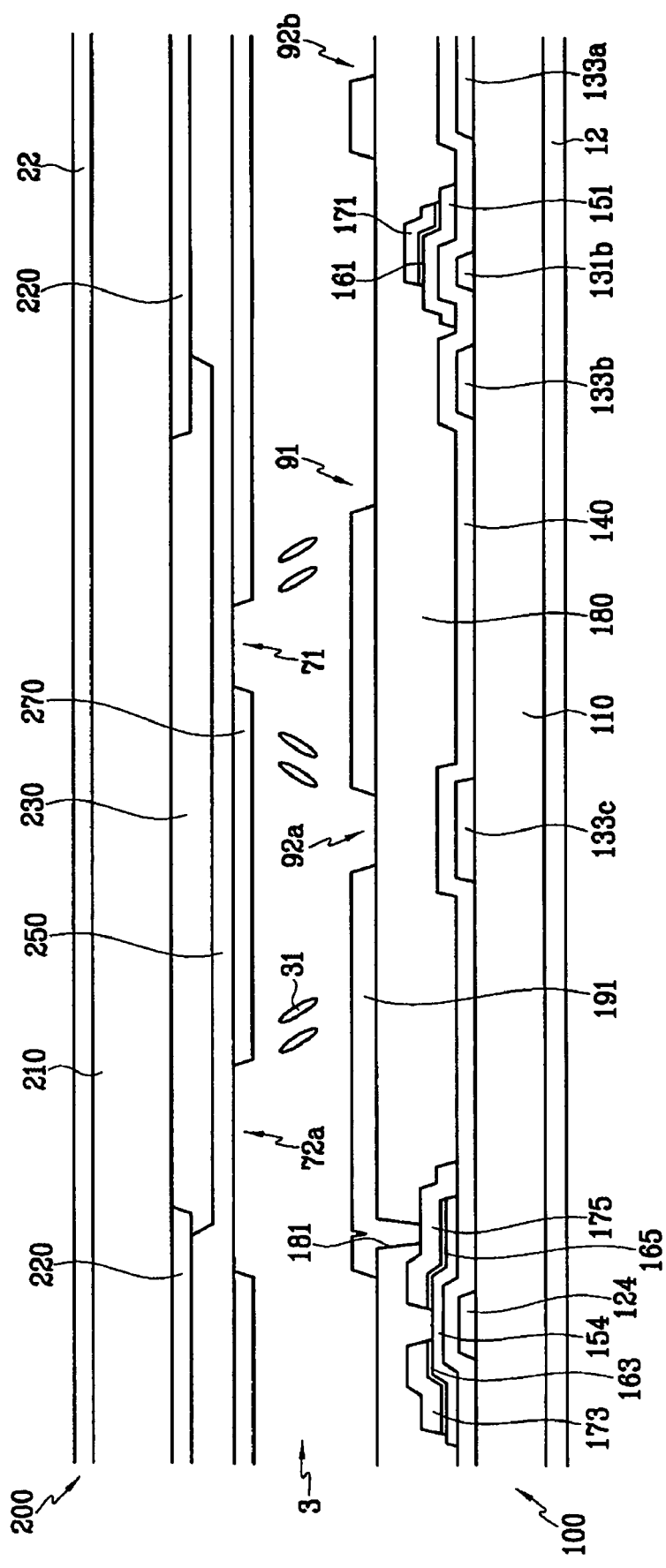
FIG. 6 is a sectional view of the LC panel assembly shown in FIG. 5 taken along line VI-VI.
Figure 7:
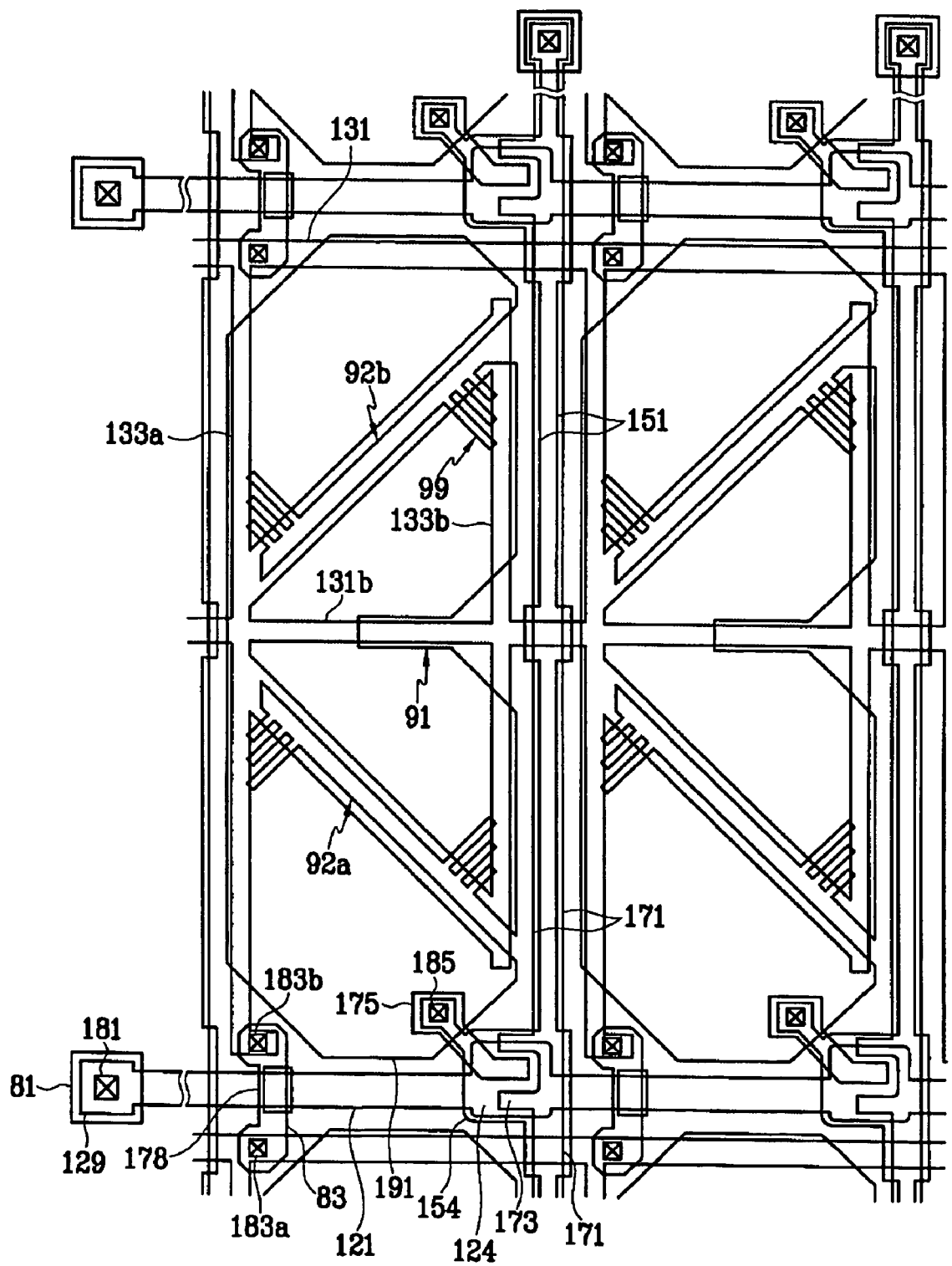
FIG. 7 is a layout view of a TFT array panel of an LC panel assembly according to another embodiment of the invention.
Figure 8A:
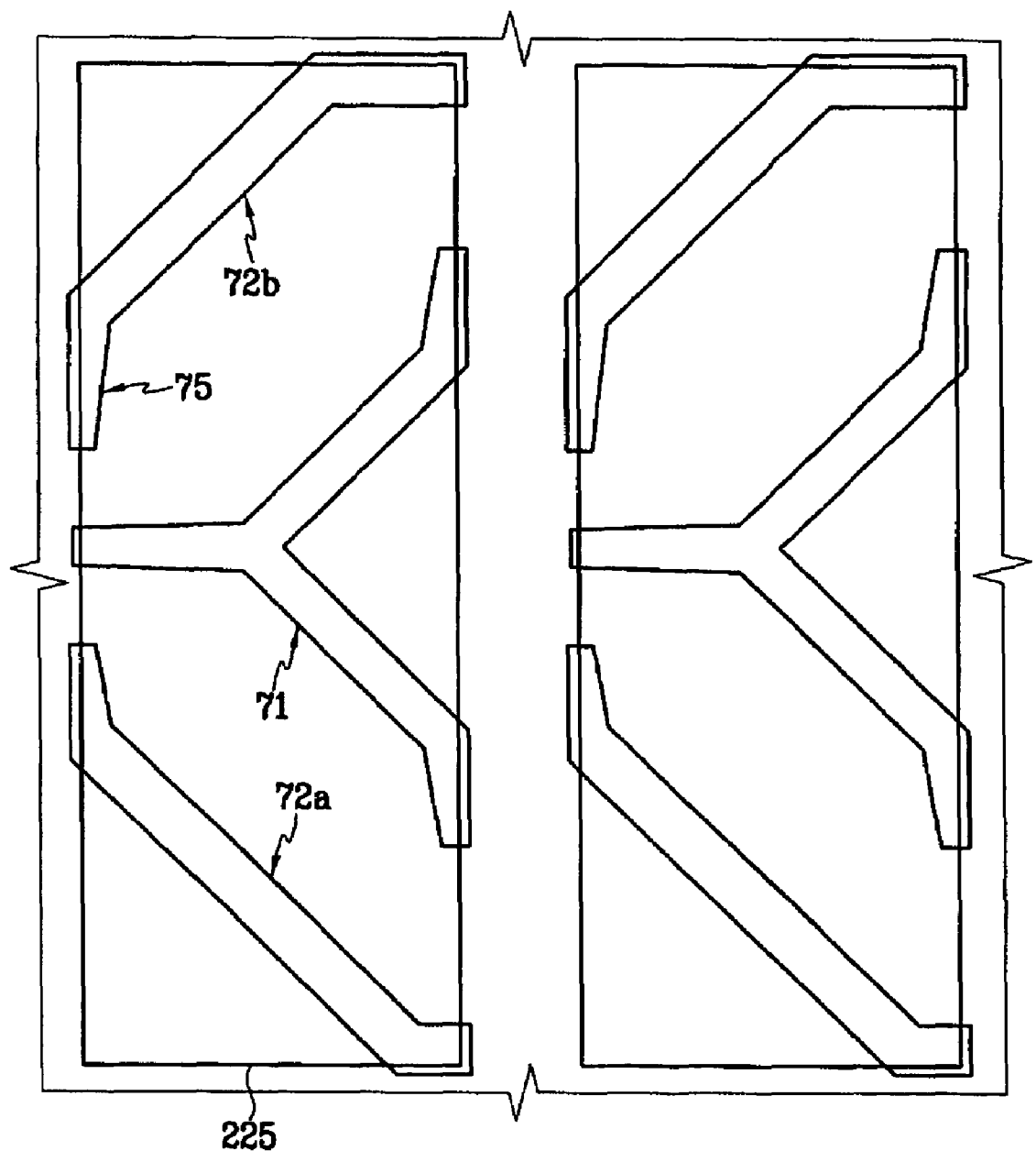
FIG. 8A and FIG. 8B are layout views showing a common electrode panel according to other embodiments of the invention.
Figure 8B:
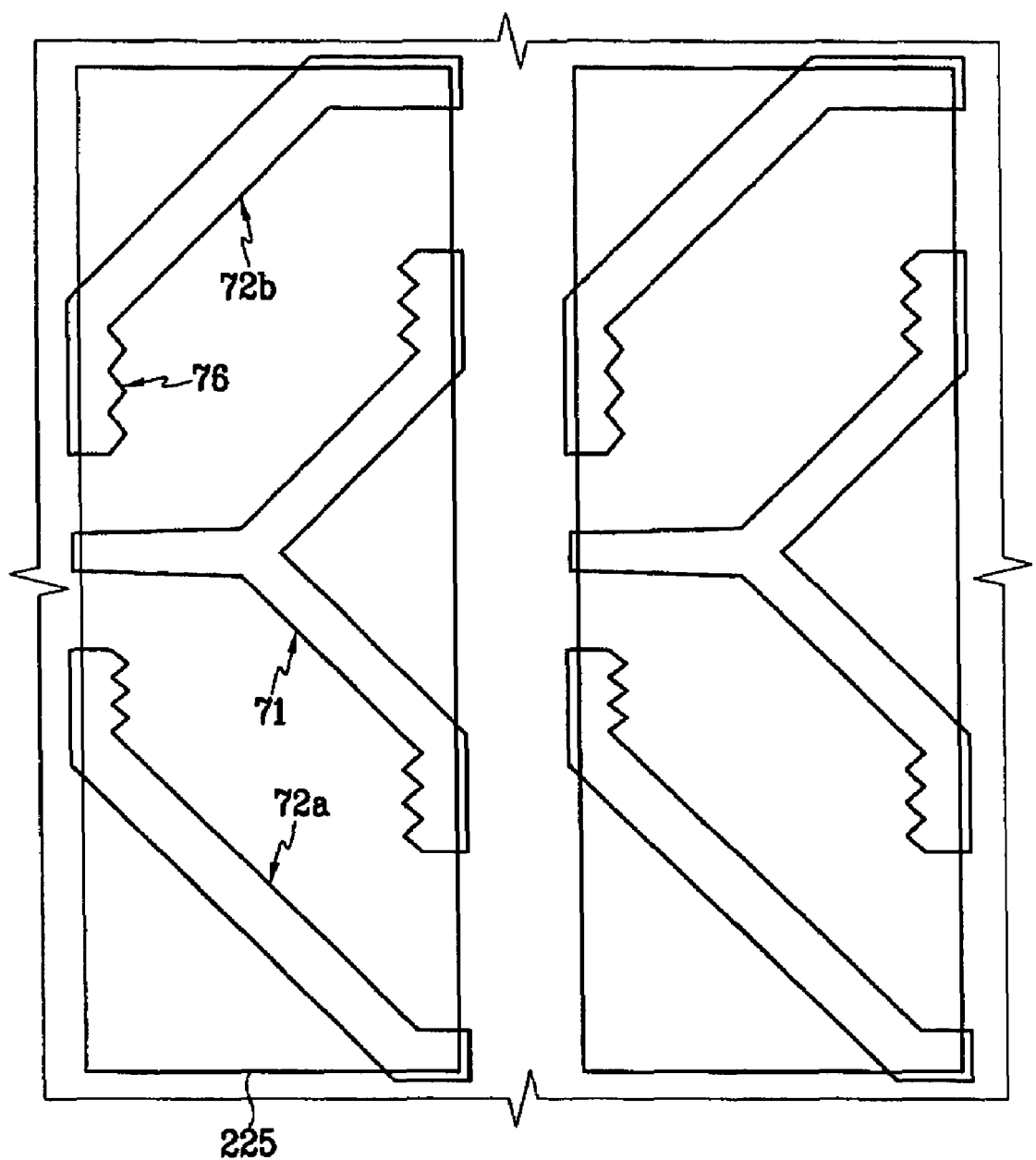

FIG. 3 is a layout view of a TFT array panel for an LCD. FIG. 4 is a layout view of a common electrode panel of an LC panel assembly. FIG. 5 is a layout view of an LC panel assembly including the TFT array panel shown in FIG. 3 and the common electrode panel shown in FIG. 4. FIG. 6 is a sectional view of the LC panel assembly shown in FIG. 5 taken along line VI-VI. FIG. 7 is a layout view of a TFT array panel of another LC panel assembly. FIG. 8A and FIG. 8B are layout views of other common electrode panels.

An LC panel assembly includes a TFT array panel 100, a common electrode panel 200 facing the TFT array panel 100, and a LC layer 3 arranged therebetween.

The TFT array panel 100 is described below with reference FIGS. 3, 5, 6, and 7.

A plurality of gate lines 121 and a plurality of storage electrode lines 131 are arranged on an insulating substrate 110, such as transparent glass or plastic.

The gate lines 121 transmit gate signals and extend substantially in a transverse direction. Each gate line 121 includes a plurality of gate electrodes 124 projecting upward and downward and an end portion 129 having an area sufficient for contact with another layer or an external driving circuit. A gate driving circuit (not shown) for generating the gate signals may be mounted on or attached with a flexible printed circuit (FPC) film (not shown), which may be attached with the substrate 110, directly mounted on the substrate 110, or integrated onto the substrate 110. The gate lines 121 may extend to be connected, e.g., coupled, with a driving circuit that may be integrated or arranged on the substrate 110.

A predetermined voltage is applied to the storage electrodes 131. Each of the storage electrode lines 131 may include a pair of first stems 131a and second stems 131b extending substantially parallel to the gate lines 121 and a plurality of sets of first storage electrode 133a, second storage electrode 133b, third storage electrode 133c, and fourth storage electrode 133d extending from the first stem 131a and the second stem 131b. Each of the storage electrode lines 131 is arranged between two adjacent gate lines 121, and the first stem 131a is arranged nearer to the upper one of the two adjacent gate lines 121, while the second stem 131b is nearly centered between the two gate lines 121.

The first storage electrode 133a extends from the first stem 131a, passes through the second stem 131b, and ends near a gate line 121 such that it includes a fixed end portion and a free end portion arranged opposite to each other. The fixed end portion is connected, e.g., coupled, with the first stem 131a, and the free end portion has a projection.

The second storage electrode 133b extends upward and downward from the second stem 131b.

The third storage electrode 133c and the fourth storage electrode 133d extend approximately from a center portion of the first storage 133a and lower and upper ends of the second storage electrode 133b, respectively.

However, the storage electrode lines 131 may include various shapes and arrangements.

The gate lines 121 and the storage electrode lines 131 may be made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, the gate lines 121 and the storage electrode lines 131 may have a multi-layered structure that includes, for example, two conductive films (not shown) having different physical characteristics. One of the two films may be made of a low resistivity metal including Al containing metal, Ag containing metal, and Cu containing metal for reducing signal delay or voltage drop. The other film may be made of a material such as Mo containing metal, Cr, Ta, or Ti, which has good physical, chemical, and electrical contact characteristics with other materials such as indium tin oxide (ITO) or indium zinc oxide (IZO). For example, the two films combination may include a lower Cr film and an upper Al (alloy) film, and a lower Al (alloy) film and an upper Mo (alloy) film. However, the gate lines 121 and the storage electrode lines 131 may be formed of various metals or conductors.

The lateral sides of the gate lines 121 and the storage electrode lines 131 are inclined relative to a surface of the substrate 110, and the inclination angle thereof ranges from about 30 degrees to about 80 degrees.

A gate insulating layer 140, which may be made of silicon nitride (SiNx) or silicon oxide (SiOx), may be formed on the gate lines 121 and the storage electrode lines 131.

A plurality of semiconductor stripes 151, which may be made of hydrogenated amorphous silicon (abbreviated to "a-Si") or polysilicon, are arranged on the gate insulating layer 140. The semiconductor stripes 151 extend substantially in the longitudinal direction and widen near the gate lines 121 and the storage electrode lines 131 such that the semiconductor stripes 151 cover sufficiently large areas of the gate lines 121 and the storage electrode lines 131. Each of the semiconductor stripes 151 includes a plurality of projections 154 extending toward the gate electrodes 124.

A plurality of ohmic contact stripes and islands 161 and 165 are arranged on the semiconductor stripes 151. The ohmic contact stripes and islands 161 and 165 may be made of n+hydrogenated a-Si heavily doped with n type impurity such as phosphorous or they may be made of silicide. Each ohmic contact stripe 161 includes a plurality of projections 163, and the projections 163 and the ohmic contact islands 165 are arranged in pairs on the projections 154 of the semiconductor stripes 151.

The lateral sides of the semiconductor stripes 151 and the ohmic contacts 161 and 165 are inclined relative to the surface of the substrate 110, and the inclination angles thereof may range from about 30 degrees to about 80 degrees.

A plurality of data lines 171, a plurality of drain electrodes 175, and a plurality of isolated metal pieces 178 are arranged on the ohmic contacts 161 and 165 and the gate insulating layer 140.

The data lines 171 transmit data signals and extend substantially in the longitudinal direction to intersect the gate lines 121. Each data line 171 also intersects the first and the second stems 131a and 131b of the storage electrode lines 131 and is arranged between adjacent pairs of storage electrodes 133a-133d. Each data line 171 may include a plurality of source electrodes 173 extending toward the gate electrodes 124 and an end portion 179 having a sufficiently large area for contact with another layer or an external driving circuit. A data driving circuit (not shown) for generating the data signals may be mounted or attached on a FPC film (not shown), which may be attached with the substrate 110, directly mounted on the substrate 110, or integrated onto the substrate 110. The data lines 171 may extend to be connected, e.g., coupled, with a driving circuit that may be integrated on the substrate 110.

The drain electrodes 175 are separated from the data lines 171 and arranged opposite the source electrodes 173 with respect to the gate electrodes 124. Each drain electrode 175 includes a sufficiently wide end portion and a sufficiently narrow end portion. The narrow end portion is partly enclosed by a curved source electrode 173.

A gate electrode 124, a source electrode 173, a drain electrode 175, and a projection 154 of a semiconductor stripe 151 form a TFT having a channel formed in the projection 154 arranged between the source electrode 173 and the drain electrode 175.

The metal pieces 178 are arranged on the gate lines 121 near the end portions of the first storage electrodes 133a.

The data lines 171, the drain electrodes 175, and the metal pieces 178 may be made of a refractory metal such as Cr, Mo, Ta, Ti, or an alloy thereof. However, they may have a multi-layered structure including a refractory metal film (not shown) and a low resistivity film (not shown). For example, the multi-layered structure may have a double-layered structure including a lower Cr/Mo (alloy) film and an upper Al (alloy) film, or a triple-layered structure of a lower Mo (alloy) film, an intermediate Al (alloy) film, and an upper Mo (alloy) film. However, it is understood that the data lines 171, the drain electrodes 175, and the metal pieces 178 may be made of various metals or conductors.

The data lines 171, the drain electrodes 175, and the metal pieces 178 have an inclined edge profile, and the inclination angles thereof range about 30 degrees to about 80 degrees.

The ohmic contacts 161 and 165 are only arranged between the underlying semiconductor stripes 151 and the overlying conductors 171 and 175 thereon and reduce contact resistance therebetween. Although the semiconductor stripes 151 are narrower than the data lines 171 at most places, the width of the semiconductor stripes 151 is increases near the gate lines 121 and the first and the second stems 131a and 131b of the storage electrode lines 131 as described above, to level the profile of the surface, thereby substantially preventing disconnection of the data lines 171. The semiconductor stripes 151 include at least one exposed portion, which is not covered with the data lines 171, the drain electrodes 175, and the metal pieces 178, such as a portion located between the source electrode 173 and the drain electrode 175.

A passivation layer 180 may be provided on the data lines 171, the drain electrodes 175, the metal pieces 178, and the exposed portion of the semiconductor stripes 151. The passivation layer 180 may be made of an inorganic or an organic insulator material and it may have a substantially level top surface. The inorganic insulator may include silicon nitride and silicon oxide. The organic insulator may have photosensitivity and a dielectric constant that is less than about 4.0. The passivation layer 180 may include a lower film formed of an inorganic insulator and an upper film formed of an organic insulator such that it exhibits insulating characteristics of the organic insulator while preventing the exposed portions of the semiconductor stripes 151 from being damaged by the organic insulator.

The passivation layer 180 includes a plurality of contact holes 182 and 185 exposing the end portions 179 of the data lines 171 and the drain electrodes 175, respectively. The passivation layer 180 and the gate insulating layer 140 have a plurality of contact holes 181 exposing the end portions 129 of the gate lines 121, a plurality of contact holes 183a exposing portions of the storage electrode lines 131 near the fixed end portions of the first storage electrodes 133a, and a plurality of contact holes 183b exposing the linear branches of the free end portions of the first storage electrodes 133a.

A plurality of pixel electrodes 191, a plurality of overpasses 83, and a plurality of contact assistants 81 and 82 may be arranged on the passivation layer 180. They may be made of a transparent conductor material such as ITO or IZO or a reflective conductor material such as Ag, Al, Cr, or an alloy thereof.

The pixel electrodes 191 are physically and electrically connected, e.g., coupled, with the drain electrodes 175 through the contact holes 185 such that the pixel electrodes 191 receive data voltages from the drain electrodes 175. The pixel electrodes 191 supplied with the data voltages generate electric fields in cooperation with a common electrode 270 of the common electrode panel 200 supplied with a common voltage, which determine the orientations of liquid crystal molecules 31 of the liquid crystal layer 100 arranged between the pixel electrode 191 and the common electrode 270. A pixel electrode 191 and the common electrode 270 form a capacitor referred to as a "liquid crystal capacitor," which stores an applied voltages even after the TFT is turned off.

A pixel electrode 191 overlaps a storage electrode line 131 including storage electrodes 133a-133d. The pixel electrode 191 and a drain electrode 175 connected thereto and the storage electrode line 131 form an additional capacitor referred to as a "storage capacitor," which enhances the voltage storing capacity of the liquid crystal capacitor.

The pixel electrode 191 may be a rectangle R-like shape having primary edges that are substantially parallel to the gate lines 121 or the data lines 171 and having chamfered corners. The chamfered corners of the pixel electrode 191 form an angle of about 45 degrees with respect to the gate lines 121.

Each pixel electrode 191 includes a center cutout 91, a lower cutout 92a, and an upper cutout 92b, which divide the pixel electrode 191 into a plurality of partitions. The cutouts 91, 92a, and 92b are substantially inversely symmetrical with respect to a second stem 131b of a storage electrode line 131.

The lower cutout 92a and the upper cutout 92b obliquely extend from a right edge of the pixel electrode 191 near right corners approximately to a center of a left edge of the pixel electrode 191 and overlap the third storage electrode 133c and the fourth storage electrode 133d, respectively. The lower cutout 92a and the upper cutout 92b are arranged at a lower half and an upper half of the pixel electrode 191, respectively, which can be divided by the second stem 131b of the storage electrode line 131. The lower cutout 92a and the upper cutout 92b form an angle of about 45 degrees with respect to the gate lines 121, and they extend substantially perpendicular to each other.

Each of the lower cutouts 92a and the upper cutouts 92b shown in FIG. 7 has a plurality of narrow rectilinear projections 99 near its ends. The projections 99 are oblique to the longitudinal edge of the pixel electrode 191 toward the edges of the pixel electrode 191. Preferably, the projections 99 form an angle of about 45 degrees with respect to the longitudinal edges of the pixel electrode 191.

The center cutout 91 extends along the second stem 131b of the storage electrode line 131 and includes an inlet from the right edge of the pixel electrode 191, which includes a pair of inclined edges arranged substantially parallel to the lower cutout 92a and the upper cutout 92b, respectively.

Accordingly, a lower half of the pixel electrode 191 is divided into two lower partitions by the lower cutout 92a, and an upper half of the pixel electrode 191 is also divided into two upper partitions by the upper cutout 92b. The number of partitions and/or the number of the cutouts varies depending on design factors such as a pixel size, a ratio of the transverse edges and the longitudinal edges of the pixel electrode 191, the type and characteristics of the liquid crystal layer 3, etc.

The contact assistants 81 and 82 are connected, e.g., coupled, with the end portions 129 of the gate lines 121 and the end portions 179 of the data lines 171 through the contact holes 181 and 182, respectively. The contact assistants 81 and 82 protect the end portions 129 and 179 and improve the adhesion between the end portion of the gate line 129 and the end portion of the data line 179 and an external device.

The overpasses 83 cross over the gate lines 121 and they are connected, e.g., coupled, with the exposed portions of the storage electrode lines 131 and the projections of the free end portions of the first storage electrodes 133a through the contact holes 183a and 183b, respectively, which are arranged opposite each other with respect to the gate lines 121. The storage electrode lines 131 including the storage electrodes 133a-133d along with the overpasses 83 may be used to repair defects in the gate lines 121, the data lines 171, and/or the TFTs.

A light blocking member 220, referred to as a black matrix, may be formed on an insulating substrate 210, such as transparent glass or plastic. The light blocking member 220 includes a plurality of openings 225 facing the pixel electrodes 191 and have substantially the same planar shape as the pixel electrodes 191 to prevent light leakage between the pixel electrodes 191. Alternatively, the light blocking member 220 may include linear portions corresponding to the data lines 171 and planar portions corresponding to the TFTs.

A plurality of color filters 230 may be arranged on the substrate 210 and disposed substantially in the openings 225 defined by the light blocking member 220. The color filters 230 may extend in a substantially longitudinal direction along the pixel electrodes 191. The color filters 230 may represent one of the primary colors, such as red, green, and blue.

An overcoat 250, which may be made of an (organic) insulator material, may be arranged on the color filters 230 and the light blocking member 220. The overcoat 250 prevents the color filters 230 from being exposed and provides a substantially level surface. The overcoat 250 may be omitted.

A common electrode 270 may be arranged on the overcoat 250. The common electrode 270 may be formed of a transparent conductive material such as ITO and IZO and may include a plurality of sets of cutouts 71, 72a and 72b.

A center cutout 71, a lower cutout 72a, and an upper cutout 72b face a pixel electrode 191. Each of the cutouts 71, 72a, and 72b is arranged between adjacent cutouts 91, 92a, and 92b of the pixel electrode 191 or between a cutout 92a or 92b and a chamfered edge of the pixel electrode 191. In addition, each of the cutouts 71, 72a, and includes 72b at least one oblique portion extending substantially parallel to the lower cutout 92a or the upper cutout 92b of the pixel electrode 191. The distance Wp between adjacent edges of adjacent cutouts 71, 72a, and 72b and 91, 92a, and 92b or between a chamfered edge of the pixel electrode 191 and an edge of a cutout 92a or 92b adjacent thereto may range from about 15 microns to about 20 microns. The cutouts 71, 72a, and 72b are substantially inversely symmetrical with respect to a second stem 131b of a storage electrode line 131.

Each of the lower cutouts 72a and the upper cutouts 72b includes an oblique portion extending approximately from a left edge portion of the pixel electrode 191 to approximately a lower or an upper edge portion of the pixel electrode 191, and transverse and longitudinal portions extending from respective end portions of the oblique portion along edge portions of the pixel electrode 191, overlapping the edge portions of the pixel electrode 191, and forming an obtuse angle with respect to the oblique portion.

The center cutout 71 includes a central transverse portion extending approximately from the left edge portion of the pixel electrode 191 along the second stem 131b of the storage electrode line 131, a pair of oblique portions extending from an end portion of the central transverse portion to approximately a right edge portion of the pixel electrode and forming an oblique angle with respect to the central transverse portion, and a pair of terminal longitudinal portions extending from the end portions of the respective oblique portions along the right edge portion of the pixel electrode 191, overlapping the right edge portion of the pixel electrode 191, and forming an obtuse angle with respect to the respective oblique portions.

Each of the longitudinal portions of the cutouts 71, 72a, and 72b shown in FIG. 8A includes a rectilinear edge 75 that is oblique with respect to the longitudinal edge portion of the pixel electrode 191 and overlaps or crosses the pixel electrode 191. Each of the longitudinal portions of the lower cutouts 72a and the upper cutouts 72b shown in FIG. 8B has a substantially saw-toothed like edge 76 overlapping or crossing the pixel electrode 191.

Referring again to FIG. 7, the rectilinear projections 99 of the lower cutouts 92a and the upper cutouts 92b in the pixel electrodes 191 overlap or cross the longitudinal portions of the cutouts 71, 72a, and 72b in the common electrode 270.

The number of the cutouts 71-72b may vary depending on design factors, and the light blocking member 220 may overlap the cutouts 71, 72a, and 72b to block or prevent the light leakage through the cutouts 71, 72a, and 72b.

Alignment layers (not shown), which may be homeotropic, may be coated or applied on inner surfaces of the panels 100 and 200. Polarizers 12 and 22 may be provided on outer surfaces of the panels 100 and 200 so that their polarization axes may be crossed and one of the polarization axes may be substantially parallel to the gate lines 121. One of the polarizers 12 and 22 may be omitted when the LC panel assembly is a reflective type LCD.

The LC panel assembly may further include at least one retardation film (not shown) for compensating the retardation of the LC layer 3.

The LC panel assembly may further include a backlight unit (not shown) that supplies light to the LC layer 3 through the polarizers 12 and 22, the retardation film, and the panels 100 and 200.

The LC layer 3 may have a negative dielectric anisotropy and be subjected to a vertical alignment such that the LC molecules 31 in the LC layer 3 are aligned with their long axes being substantially vertical to the surfaces of the panels 100 and 200 in absence of an electric field, e.g., voltage is not applied thereto. Accordingly, incident light cannot pass through the crossed polarization system 12 and 22.

When the common voltage is applied to the common electrode 270 and a data voltage is applied to the pixel electrodes 191, an electric field that is substantially perpendicular to the surfaces of the panels 100 and 200 is generated. Accordingly, the pixel electrodes 191 and the common electrode 191 are referred to as field generating electrodes. The LC molecules 31 tend to change orientations in response to the electric field so that their long axes are substantially perpendicular to the field direction.

The cutouts 71, 72a, and 72b and 91, 92a, and 92b of the field generating electrodes 191 and 270 and the edges of the pixel electrodes 191 distort the electric field to have a substantially horizontal component that determines the tilt directions of the LC molecules 31. The substantially horizontal component is substantially perpendicular to the edge portions of the cutouts 71, 72a, and 72b and 91, 92a, and 92b and the edge portions of the pixel electrodes 191.

Referring to FIG. 5, a set of the cutouts 71, 72a, and 72b and 91, 92a, and 92b divides a pixel electrode 191 into a plurality of sub-areas and each sub-area includes two major edges that are oblique to the primary edges of the pixel electrode 191. Therefore, for example, since most of the LC molecules 31 on each sub-area tilt substantially perpendicular to the major edges, the azimuthal distribution of the tilt directions are localized to about four directions, thereby increasing the reference viewing angle of the LCD.

The rectilinear projections 99 of the lower cutouts 92a and the upper cutouts 92b shown in FIG. 7 align the LC molecules 31 with themselves to weaken the horizontal component of the electric field generated by the longitudinal edges of the pixel electrodes 191, thereby improving the major tilt directions of the LC molecules 31.

Similarly, the oblique edges 75 of the cutouts 71, 72a, and 72b shown in FIG. 8A and the substantially saw-toothed like edges 76 of the cutouts 71, 72a, and 72b shown in FIG. 8B enable the LC molecules 31 to align oblique with respect to the longitudinal edges of the pixel electrodes 191 to weaken the horizontal component of the electric field generated by the longitudinal edges of the pixel electrodes 191.

Accordingly, the rectilinear projections 99, the oblique edges 75, and the saw-toothed like edges 76 reduce the distortion of the alignment of the LC molecules 31 to weaken the texture and to improve the response time of the LC molecules 31.

At least one of the cutouts 71, 72a, and 72b and 91, 92a, and 92b may be substituted with protrusions (not shown) or depressions (not shown). The protrusions may be made of an organic material or an inorganic material and are disposed on or under the field-generating electrodes 191 or 270.

It is understood that the shapes and the arrangements of the cutouts 71-72b and 91-92b may be modified.

An LCD according to another embodiment of the invention is described below with reference to FIGS. 9, 10, 11, 12, and 13.

Figure 9:
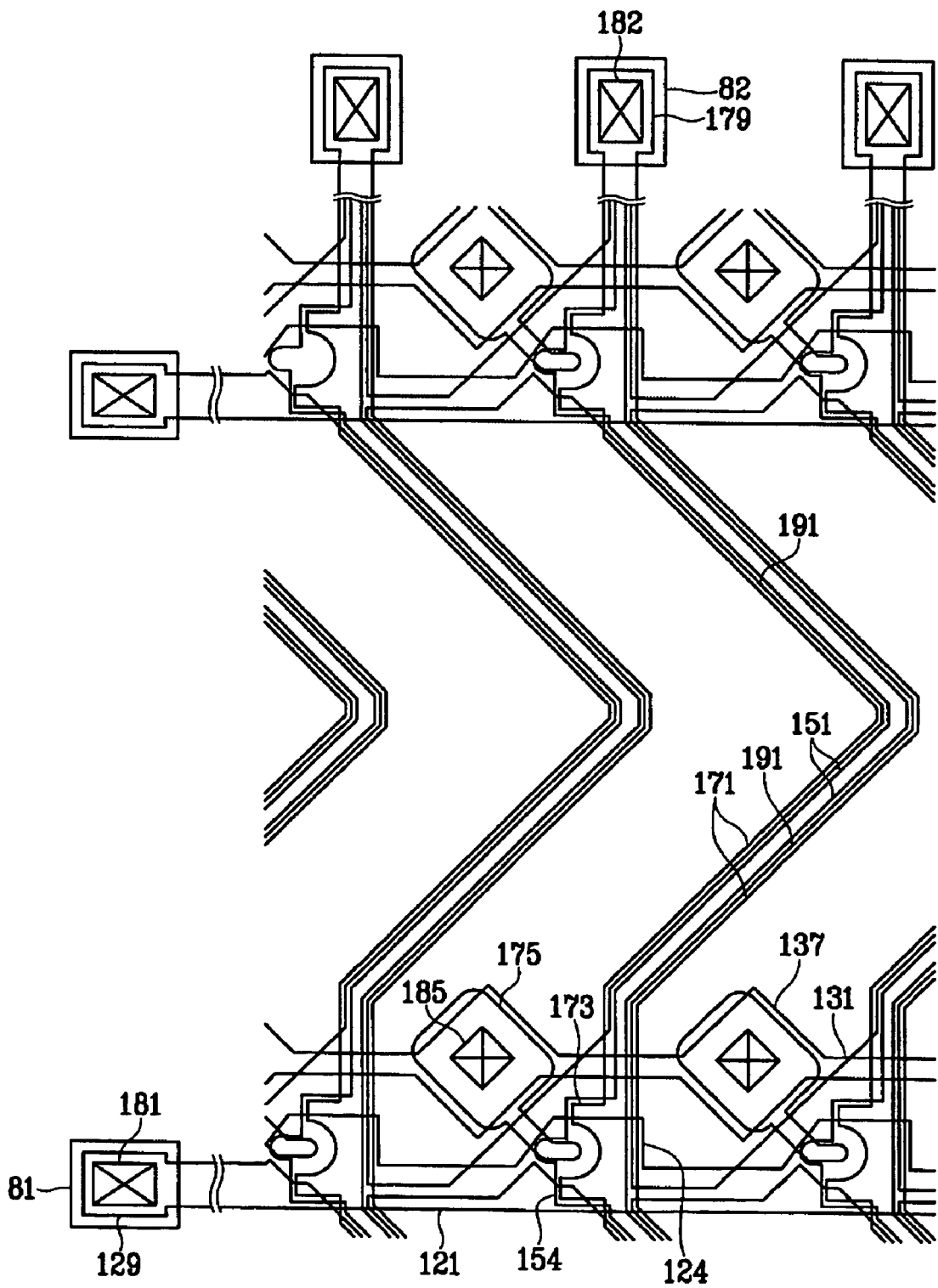
FIG. 9 is a layout view of a TFT array panel for an LCD according to another embodiment of the invention.
Figure 10:
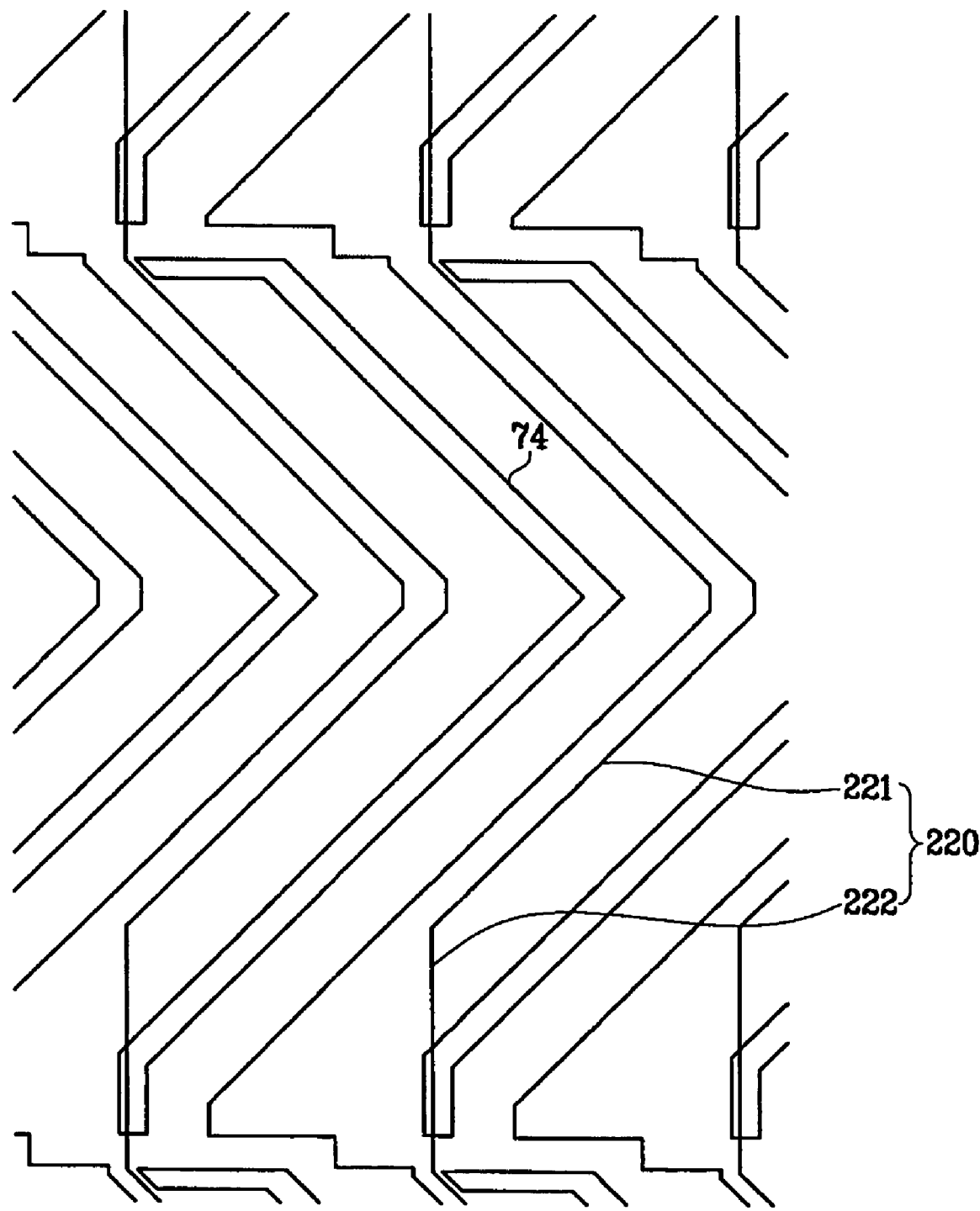
FIG. 10 is a layout view of a common electrode panel for an LCD according to another embodiment of the invention.
Figure 11:
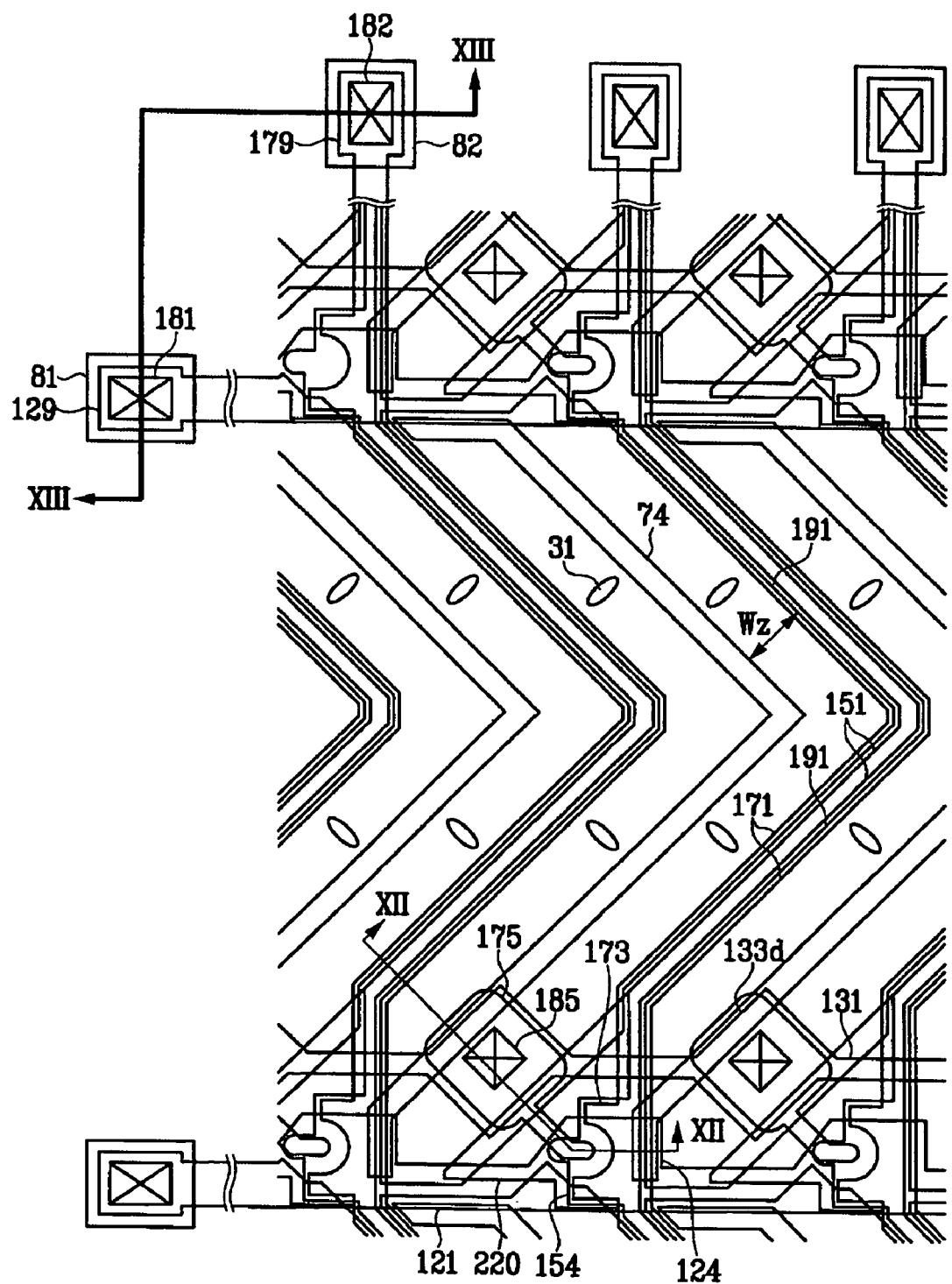
FIG. 11 is a layout view of an LCD including the TFT array panel shown in FIG. 9 and the common electrode panel shown in FIG. 10.
Figure 12:
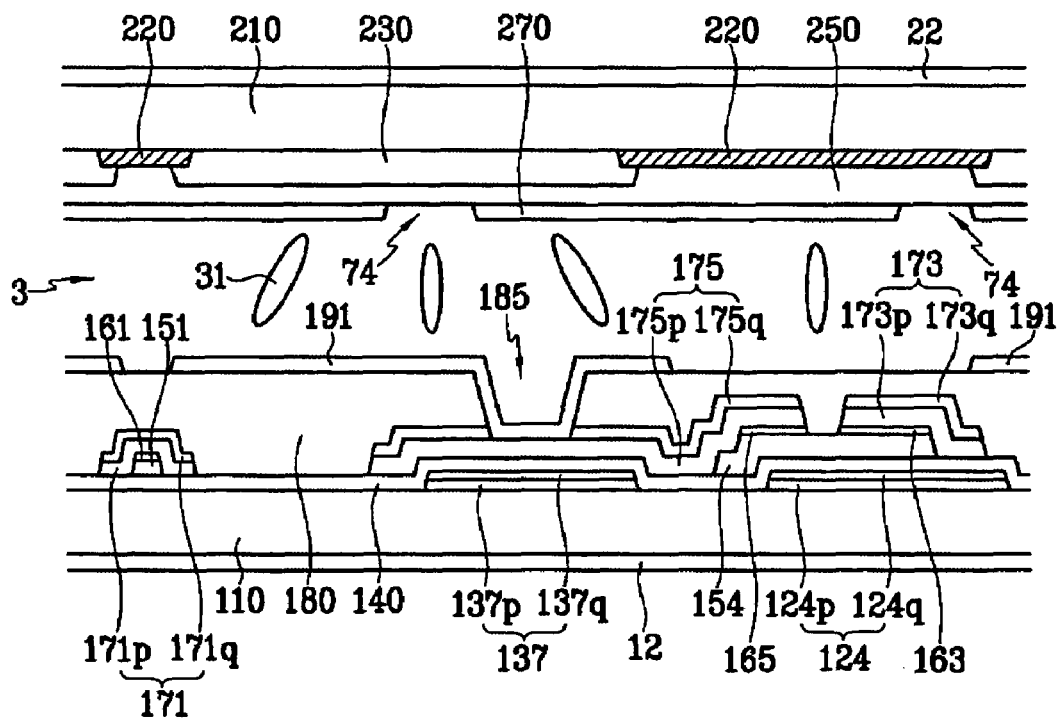
FIG. 12 is a sectional view of the LCD shown in FIG. 11 taken along the line XII-XII.
Figure 13:
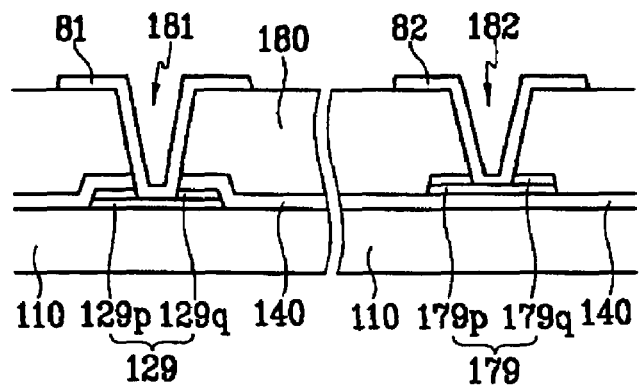
FIG. 13 is a sectional view of the LCD shown in FIG. 11 taken along the lines XIII-XIII.

FIG. 9 is a layout view of a TFT array panel for an LCD. FIG. 10 is a layout view of a common electrode panel for an LCD. FIG. 11 is a layout view of an LCD including the TFT array panel shown in FIG. 9 and the common electrode panel shown in FIG. 10. FIG. 12 is a sectional view of the LCD shown in FIG. 11 taken along the line XII-XII. FIG. 13 is a sectional view of the LCD shown in FIG. 11 taken along the lines XIII-XIII.

An LCD according to this embodiment includes a TFT array panel 100, a common electrode panel 200 facing the TFT array panel 100, and a LC layer 3 arranged between the TFT array panel 100 and the common electrode panel 200.

The TFT array panel 100 is described below with reference to FIGS. 9, 11, 12, and 13.

A plurality of gate lines 121 and a plurality of storage electrode lines 131 are arranged on an insulating substrate 110 such as transparent glass or plastic.

The gate lines 121 transmit gate signals and extend in a substantially transverse direction. Each of the gate lines 121 includes a plurality of gate electrodes 124 extending upward and an end portion 129 having an area sufficient for contact with another layer or an external driving circuit. A gate driving circuit (not shown) for generating the gate signals may be mounted or attached on a flexible printed circuit (FPC) film (not shown), which may be attached with the substrate 110, directly mounted on the substrate 110, or integrated onto the substrate 110. The gate lines 121 may extend to be connected, e.g., coupled, with a driving circuit that may be integrated on the substrate 110.

The storage electrodes 131 are supplied with a predetermined voltage and extend substantially parallel to the gate lines 121. Each of the storage electrode lines 131 is arranged between two adjacent gate lines 121, preferably close to the lower one of the two adjacent gate lines 121. Each of the storage electrode lines 131 includes a plurality of storage electrodes 137 having a substantially diamond shape or a substantially rectangle shape that is rotated by about 45 degrees. However, the storage electrode lines 131 may have various shapes and arrangements.

The gate lines 121 and the storage electrode lines 131 includes multiple conductive films, e.g., a lower conductive film and an upper conductive film arranged thereon, which have different physical characteristics. The upper film may be made of a low resistivity metal including Al containing metal such as Al and Al alloy, Ag containing metal such as Ag and Ag alloy, and Cu containing metal such as Cu and Cu alloy, for reducing signal delay or voltage drop. The lower film may be made of a material such as Mo containing metal such as Mo and Mo alloy, Cr, Ta, or Ti, which has good physical, chemical, and electrical contact characteristics with other materials such as indium tin oxide (ITO) or indium zinc oxide (IZO). For example, the combination of the two films may include a lower Cr film and an upper Al (alloy) film. The end portions 129 of the gate lines 121 of the upper film 129q may be removed to expose the lower film 129p.

However, the upper film may be made of a conductive material, and the lower film may be made of a low resistivity material. In addition, the gate lines 121 and the storage electrode lines 131 may include a single layer, preferably made of the above-described materials.

In FIG. 12 and FIG. 13, for the gate electrodes 124 and the storage electrodes 137, the lower and upper films thereof are denoted by additional characters p and q, respectively.

The lateral sides of the gate lines 121 and the storage electrode lines 131 are inclined relative to a surface of the substrate 110, and the inclination angle thereof ranges about 30 degrees to about 80 degrees.

A gate insulating layer 140, which may be made of silicon nitride (SiNx) or silicon oxide (SiOx) may be arranged on the gate lines 121 and the storage electrode lines 131.

A plurality of semiconductor stripes 151, which may be made of hydrogenated amorphous silicon (abbreviated to "a-Si") or polysilicon, which may be arranged on the gate insulating layer 140. Each of the semiconductor stripes 151 extends substantially in the longitudinal direction and may have curved portions. Each of the semiconductor stripes 151 includes a plurality of projections 154 extending toward the gate electrodes 124.

A plurality of ohmic contact stripes and islands 161 and 165 may be arranged on the semiconductor stripes 151. The ohmic contact stripes and islands 161 and 165 may be made of n+hydrogenated a-Si heavily doped with n type impurity such as phosphorous, or a silicide material. Each ohmic contact stripe 161 may include a plurality of projections 163, and the projections 163 and the ohmic contact islands 165 are arranged in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range of about 30 degrees to about 80 degrees.

A plurality of data lines 171 and a plurality of drain electrodes 175 may be arranged on the ohmic contacts 161 and 165 and the gate insulating layer 140.

The data lines 171 transmit data signals and extend in the substantially longitudinal direction to intersect the gate lines 121 and the storage electrode lines 131. Each of the data lines 171 may include a plurality of curved portions and a plurality of longitudinal portions, which are alternately connected, e.g., coupled, with each other. Each of the curved portions may include a pair of oblique portions connected, e.g., coupled, with each other to form a chevron, and the oblique portions of the data lines 171 may form an angle of about 45 degrees with the gate lines 121. Each of the longitudinal portions intersects the gate lines 121 and includes a plurality of source electrodes 173 extending toward the gate electrodes 124. The length of a curved portion is about one to about nine times the length of a longitudinal portion. Thus, for example, the curved portion occupies about 50 to about 90 percent of the total length of the curved portion plus the longitudinal portion. Each curved portion may be curved at least twice.

Each data line 171 further includes an end portion 179 having an area sufficient for contact with another layer and/or an external device. A data driving circuit (not shown) for generating the data signals may be mounted or attached on a FPC film (not shown), which may be attached with the substrate 110, directly mounted on the substrate 110, or integrated onto the substrate 110. The data lines 171 may extend to be connected, e.g., coupled, with a driving circuit that may be integrated on the substrate 110.

The drain electrodes 175 are kept apart from the data lines 171 and arranged opposite to the source electrodes 173 with respect to the gate electrodes 124. Each of the drain electrodes 175 may include a substantially rectangular like or rhombic like end portion and a sufficiently narrow end portion. For example, the rhombic end portion may overlaps a storage electrode and the narrow end portion may be partially enclosed by a source electrode 173 that is curved like a character "J".

A gate electrode 124, a source electrode 173, a drain electrode 175, and a projection 154 of a semiconductor stripe 151 together form a TFT having a channel formed in the projection 154 that is arranged between the source electrode 173 and the drain electrode 175.

The data lines 171 and the drain electrodes 175 may include multiple conductive films, e.g., a lower film 171p and 175p, respectively, and an upper film 171q and 175q, respectively, disposed thereon, which have different physical characteristics. The upper film 171q and 175q may be made of a low resistivity metal including Al containing metal such as Al and Al alloy, Ag containing metal such as Ag and Ag alloy, and Cu containing metal such as Cu and Cu alloy, for reducing signal delay or voltage drop. The lower film 171p and 175p may be made of a refractory metal such as Cr, Mo, Ta, Ti, or alloys thereof. For example, the combination of the two films may include a lower Cr/Mo (alloy) film and an upper Al (alloy) film. The end portions 179 of the gate lines 171 of the upper film 179q may be removed to expose the lower film 179p. Alternatively, the data lines 171 and the drain electrodes 175 may include a single layer that is preferably made of the above-described materials.

In FIG. 12 and FIG. 13, the lower film and the upper film of the source electrodes 173 are denoted by additional characters p and q, respectively.

The data lines 171 and the drain electrodes 175 have inclined edge profiles, and the inclination angles thereof range about 30 degrees to about 80 degrees.

The ohmic contacts 161 and 165 are only arranged between the underlying semiconductor stripes 151 and the overlying conductors 171 and 175 thereon and reduce the contact resistance therebetween. The semiconductor stripes 151 include some exposed portions, which are not covered with the data lines 171 and the drain electrodes 175, such as a portion located between the source electrodes 173 and the drain electrodes 175.

A passivation layer 180 may be arranged on the data lines 171, the drain electrodes 175, and the exposed portions of the semiconductor stripes 151. The passivation layer 180 may be preferably made of an inorganic insulator material or an organic insulator material and may have a substantially level surface. For example, of the inorganic insulator may include silicon nitride and silicon oxide. The organic insulator may be photosensitive and have a dielectric constant that is less than about 4.0. The passivation layer 180 may include a lower film formed of an inorganic insulator material and an upper film formed of an organic insulator material such that it exhibits the excellent insulating characteristics while preventing the exposed portions of the semiconductor stripes 151 from being damaged by the organic insulator.

The passivation layer 180 includes a plurality of contact holes 182 and 185 exposing the lower film 179p of the end portions 179 of the data lines 171 and the lower film 175p of the substantially rhombic end portions of the drain electrodes 175, respectively. The passivation layer 180 and the gate insulating layer 140 include a plurality of contact holes 181 exposing the lower film 129p of the end portions 129 of the gate lines 121.

A plurality of pixel electrodes 191 and a plurality of contact assistants 81 and 82 are arranged on the passivation layer 180 preferably made of a transparent conductor material such as ITO or IZO or a reflective conductor material such as Ag, Al, Cr, or an alloy thereof.

Each of the pixel electrodes 191 may further include a plurality of oblique edges that are arranged substantially parallel to the oblique portions of the data lines 171 and a plurality of transverse portions and longitudinal portions that are arranged substantially parallel to the gate lines 121 and the data lines 171, respectively, thereby forming a chevron. The pixel electrodes 191 cover the storage electrode lines 131 including the storage electrodes 137 and the rhombic end portions of the drain electrodes 175.

The pixel electrodes 191 are physically and electrically connected, e.g., coupled, with the drain electrodes 175 through the contact holes 185 such that the pixel electrodes 191 receive data voltages from the drain electrodes 175. The pixel electrodes 191 supplied with the data voltages generate electric fields in cooperation with a common electrode 270 of the common electrode panel 200 that is supplied with a common voltage, the generated electric fields determine the orientations of liquid crystal molecules 31 of the liquid crystal layer 3 disposed between the pixel electrode 191 and the common electrode 270. The pixel electrode 191 and the common electrode form a capacitor referred to as a "liquid crystal capacitor," which stores an applied voltage when the TFT is turned off.

A pixel electrode 191 and a rhombic like end portion of a drain electrode 175 connected thereto overlap a storage electrode line 131 that includes a storage electrode 137. The pixel electrode 191 and the drain electrode 175 connected thereto and the storage electrode line 131 together form an additional capacitor referred to as a "storage capacitor," which increases the voltage storage capacity of the liquid crystal capacitor.

The pixel electrodes 191 overlap or cross the data lines 171 and the gate lines 121 to increase aperture ratio.

The contact assistants 81 and 82 are connected, e.g., coupled, with the end portions 129 of the gate lines 121 and the end portions 179 of the data lines 171 through the contact holes 181 and 182, respectively. The contact assistants 81 and 82 operate to protect the end portions 129 and 179 and increase the adhesion between the end portions 129 and 179 and an external device.

The common electrode panel 200 is described below with reference to FIGS. 10, 11, 12, and 13.

A light blocking member 220, referred to as a black matrix 220, may be arranged on an insulating substrate 210 such as transparent glass or plastic. The light blocking member 220 may include a plurality of curved portions 221 facing the curved portions of the data lines 171 and a plurality of triangular like shaped portions 222 facing the TFTs such that the light blocking member 220 blocks or prevents light leakage between the pixel electrodes 191 and defines an open area facing the pixel electrodes 191. Alternatively, the light blocking member 220 may have a plurality of openings (not shown)

that face the pixel electrodes 191 and have substantially the same shape as the pixel electrodes 191.

A plurality of color filters 230 may be arranged on the substrate 210 and the light blocking member 220. The color filters 230 may be arranged substantially in the open area defined by the light blocking member 220 and the color filters 230 may extend along columns of the pixel electrodes 191. Each of the color filters 230 may represent a color, e.g., one of primary colors including red, green and blue colors.

An overcoat 250, which may be made of an (organic) insulator material, may be arranged on the color filters 230 and the light blocking member 220. The overcoat 250 operates to prevent the color filters 230 from being exposed and to also provide a substantially flat surface. The overcoat 250 may be omitted.

A common electrode 270 may be arranged on the overcoat 250. The common electrode 270, which may be made of a transparent conductive material such as ITO and IZO, may include a plurality of chevron-like cutouts 71.

Specifically, each cutout 71 may include a curved portion having a pair of oblique portions that are arranged parallel to each other, a transverse portion connected, e.g., coupled, with one end of the curved portion, and a longitudinal portion connected, e.g., coupled, with the other end of the curved portion. The curved portion of the cutout 71 extends substantially parallel to the curved portions of the data lines 171 and faces a pixel electrode 191 so that the curved portion may substantially bisect the pixel electrode 191 into a left half and a right half. The transverse portion and the longitudinal portion of the cutout 71 are aligned with transverse and longitudinal edges of the pixel electrode 191, respectively, and they each form an obtuse angle with respect to the curved portion of the cutout 71.

Alignment layers (not shown), which may be homeotropic, may be coated or applied on inner surfaces of the panels 100 and 200. Polarizers 12 and 22 may be arranged on outer surfaces of the panels 100 and 200 so that their polarization axes may cross and one of the polarization axes may be parallel with respect to the gate lines 121. One of the polarizers 12 and 22 may be omitted when the LCD is a reflective type LCD.

The LCD may further include at least one retardation film (not shown) for compensating the retardation of the LC layer 3.

The LCD may further include a backlight unit (not shown) that supplies light to the LC layer 3 through the polarizers 12 and 22, the retardation film, and the panels 100 and 200.

The LC layer 3 may have a negative dielectric anisotropy and may be subjected to a vertical alignment that the LC molecules 31 in the LC layer 3 are aligned with their long axes being substantially vertical to the surfaces of the panels 100 and 200 in absence of an electric field, e.g., when a voltage is not applied thereto. Accordingly, incident light cannot pass through the crossed polarization system 12 and 22.

When a common voltage is applied to the common electrode 270 and a data voltage is applied to the pixel electrodes 191, a primary electric field that is substantially perpendicular to the surfaces of the panels 100 and 200 is generated. Accordingly, the pixel electrode 191 and the common electrode 191 are referred to as field generating electrodes. The LC molecules 31 change orientation in response to the generated electric field so that their long axes may be substantially perpendicular to the field direction.

The cutouts 71 of the common electrode 270 and the edges of the pixel electrodes 191 distort the primary electric field to have a substantially horizontal component that determines the tilt directions of the LC molecules 31. The substantially horizontal component of the primary electric field is substantially perpendicular to the edges of the cutouts 71 and the edges of the pixel electrodes 191.

Referring to FIG. 11, a cutout 71 substantially bisecting a pixel electrode 191 and an imaginary transverse line connecting curved points of the pixel electrode 191 may divide the pixel electrode 191 into four sub-areas. Each of the sub-areas has two major edges defined by the curved portions of the cutout 71 and the oblique edges of the pixel electrode 290. The distance Wz between major edges of a sub-area ranges is preferably about 10 microns to about 30 microns, and more preferably about 15 microns to about 20 microns. Therefore, since most of the LC molecules 31 on each sub-area tilt substantially perpendicular to the major edges, the azimuthal distribution of the tilt directions are localized to about four directions, thereby increasing the reference viewing angle of the LCD.

It is understood that the number of sub-areas is not limited to four, and the number of the sub-areas may be, for example, eight or six. This may be obtained by changing a number of the cutouts 71 at the common electrode 270, by providing cutouts at the pixel electrodes 191, or by changing the number of curved points in the edges of the pixel electrodes 191.

The direction of a secondary electric field due to the voltage difference between the pixel electrodes 191 is substantially perpendicular to the major edges of the sub-areas. Accordingly, the field direction of the secondary electric field coincides with that of the horizontal component of the primary electric field. Thus, the secondary electric field formed between the pixel electrodes 191 enhances the determination of the tilt directions of the LC molecules 31.

The cutouts 71 may be substituted with protrusions (not shown) or depressions (not shown). The protrusions may be made of an organic material or an inorganic material and arranged on or under the pixel electrode 191 or the common electrode 270.

Referring again to FIG. 1, the gray voltage generator 800 may generates two sets of a plurality of (reference) gray voltages related to the transmittance of the pixels. The gray voltages in one of the sets have a positive polarity with respect to the common voltage Vcom, while the gray voltages in another set have a negative polarity with respect to the common voltage Vcom.

The gate driver 400 is connected, e.g., coupled, with the gate lines $G_1$-$G_n$ of the panel assembly 300 and synthesizes a gate-on voltage Von and a gate-off voltage Voff to generate the gate signals that are applied to the gate lines $G_1$-$G_n$.

The data driver 500 is connected, e.g., coupled, with the data lines $D_1$-$D_m$ of the panel assembly 300 and applies data signals to the data lines $D_1$-$D_m$, the data signals being selected from the gray voltages supplied from the gray voltage generator 800. However, when the gray voltage generator 800 generates less than all of the gray voltages for all of the grays, the data driver 500 may divide the reference gray voltages to generate all the gray voltages so that the data signals may be selected from among the gray voltages.

The signal controller 600 controls the gate driver 400 and the data driver 500.

The gate driver 400, the data driver 500-, the signal controller 600, and the gray is voltage generator 800 may each include at least one integrated circuit (IC) chip mounted or attached on the LC panel assembly 300 or on a flexible printed circuit (FPC) film in a tape carrier package (TCP) type, which are attached with the panel assembly 300. Alternately, at least one of the gate driver 400, the data driver 500, the signal controller 600 and the gray voltage generator 800 may be integrated into the panel assembly 300 along with the signal lines $G_1$-$G_n$ and $D_1$-$D_m$ and the switching elements Q. Alternatively, all the gate driver 400, the data driver 500, the signal controller 600 and the gray voltage generator 800 may be integrated into a single IC chip, but at least one of the driving devices 400, 500, 600 and 800 or at least one circuit element in at least one of the processing units devices 400, 500, 600 and 800 may be disposed out of the single IC chip.

A method for operating the above-described LCD is described below according to an embodiment of the invention.

The signal controller 600 is supplied with input image signals R, G and B and input control signals for controlling the display thereof from a graphics controller (not shown) provided externally. The input image signals R, G and B include luminance information for the pixels PX and the luminance has a predetermined number of grays, for example, $1024(=2^{10})$, $256(=2^8)$, or $64(=2^6)$. The input control signals include a vertical synchronization signal Vsync, a horizontal synchronization signal Hsync, a main clock MCLK, and a data enable signal DE.

On the basis of the input control signals and the input image signals R, G and B, the signal controller 600 generates gate control signals CONT1 and data control signals CONT2 and processes the image signals R, G and B that are suitable for the operation of the panel assembly 300 and the data driver 500. The signal controller 600 sends the scanning control signals CONT1 to the gate driver 400 and sends the processed image signals DAT and the data control signals CONT2 to the data driver 500. The output image signals DAT are digital signals having a predetermined number of values (or grays).

The gate control signals CONT1 include a scanning start signal STV for instructing to start scanning and at least one clock signal for controlling the output period of the gate-on voltage Von. The scanning control signals CONT1 may further include an output enable signal OE for defining the duration of the gate-on voltage Von.

The data control signals CONT2 include a horizontal synchronization start signal STH for informing of start of data transmission for a row of pixels PX, a load signal LOAD for instructing to apply the data signals to the data lines $D_1$-$D_m$, and a data clock signal HCLK. The data control signal CONT2 may further include an inversion signal RVS for reversing the polarity of the voltage of the data signals relative to the common voltage Vcom.

Responding to the data control signals CONT2 received from the signal controller 600, the data driver 500 receives a packet of the digital image signals DAT for the row of pixels PX from the signal controller 600, converts the digital image signals DAT into analog data signals selected from the gray voltages, and applies the analog data signals to the data lines $D_1$-$D_m$. The number of the gray voltages generated by the gray voltage generator 800 is equal to the number of the grays represented by the digital output image signals DAT.

The gate driver 400 applies the gate-on voltage Von to a gate line $G_1$-$G_n$ in response to the scanning control signals CONT1 received from the signal controller 600, thereby turning on the switching transistors Q connected thereto. The data signals applied to the data lines $D_1$-$D_m$ are then supplied to the pixels PX through the activated switching transistors Q.

The difference between the voltage of a data signal and the common voltage Vcom applied to a pixel PX is represented as a voltage across the LC capacitor $C_{LC}$ of the pixel PX, which is referred to as a pixel voltage. The alterations of the LC molecules in the LC capacitor $C_{LC}$ depend on a magnitude of the pixel voltage. The molecular orientations determine the polarization of light passing through the LC layer 3. The polarizer(s) converts the light polarization into the light transmittance such that the pixel PX has a luminance represented by a gray value of the data signal.

By repeating this procedure by a unit of a horizontal period (referred to as "1H" and equal to one period of the horizontal synchronization signal Hsync and the data enable signal DE), all gate lines $G_1$-$G_n$ are sequentially supplied with the gate-on voltage Von, thereby applying the data signals to all pixels PX to display an image for a frame.

When a next frame starts after one frame finishes, the inversion control signal RVS applied to the data driver 500 is controlled such that the polarity of the data signals is reversed, which is referred to as "frame inversion". The inversion control signal RVS may also be controlled such that the polarity of the data signals flowing in a data line are periodically reversed during one frame, e.g., row inversion and dot inversion, or the polarity of the data signals in one packet are reversed, e.g., column inversion and dot inversion.

The voltage applied across the LC capacitor CLC reorients the LC molecules in the LC layer 3 to a stable state corresponding to the voltage. Reorienting of the LC molecules takes time depending on the response time of the LC molecules. The LC molecules continue to reorient themselves to vary the light transmittance until reaching the stable state on the condition that the application of the voltage across the LC capacitor CLC is maintained. When the LC molecules reach the stable state and stop reorienting, the light transmittance becomes fixed.

A pixel voltage in a stable or fixed state is referred to as a target pixel voltage and a light transmittance in the stable or fixed state is referred to as a target light transmittance. The target pixel voltage and the target light transmittance have substantially a one-to-one correspondence.

Since the time for turning on the switching element Q of each pixel PX to apply a data voltage to the pixel is limited, it is difficult for the LC molecules in the pixel PX to reach the stable state during the application of the data voltage. However, even though the switching element Q is turned off, there remains a voltage across the LC capacitor CLC and thus the LC molecules continue reorienting such that the capacitance of the LC capacitor CLC changes. Ignoring leakage current, the total amount of electrical charges stored in the LC capacitor CLC is kept constant when the switching element Q turns off since one terminal of the LC capacitor CLC is a floating terminal. Therefore, the variation of the capacitance of the LC capacitor CLC results in the variation of the voltage across the LC capacitor CLC, i.e., the pixel voltage.

Consequently, when a pixel PX is supplied with a data voltage corresponding to a target pixel voltage (a "target data voltage"), which is determined in the stable state, an actual pixel voltage of the pixel PX may be different from the target pixel voltage such that the pixel PX may not reach a corresponding target light transmittance. The difference between the actual pixel voltage and the target pixel voltage increases as the difference between the target transmittance and a light transmittance that the pixel PX initially has increases.

Accordingly, it is necessary for a data voltage applied to the pixel PX to be higher or lower than a target data voltage, which, for example, can be realized by DCC (dynamic capacitance compensation).

According to an embodiment of the invention, DCC, which may be performed by the signal controller 600 or a separate image signal modifier, modifies an image signal of a frame (a "current image signal") for a pixel to generate a modified current image signal ("modified image signal") based on an image signal of an immediately previous frame (a "previous image signal") for the pixel. The modified image signal may be experimentally obtained. The difference between the modified current image signal and the previous image signal is typically greater than the difference between the current image signal before modification and the previous image signal. However, when the current image signal and the previous image signal are equal to each other or the difference therebetween is small, the modified image signal may be equal to the current image signal, e.g., the current image signal may not be modified.

TABLE 1 shows exemplary modified image signals for pairs of previous image signals $g_{N-1}$ and current image signals $g_N$ in a 256 gray system.

TABLE 1

|  |  | $g_{N-1}$ | | | | | | | | |
|---|---|---|---|---|---|---|---|---|---|---|
|  |  | 0 | 32 | 64 | 96 | 128 | 160 | 192 | 224 | 255 |
| $g_N$ | 0 | 0 | 0 | 0 | 0 | 0 | 0 | 0 | 0 | 0 |
|  | 32 | 115 | 32 | 22 | 20 | 15 | 15 | 15 | 15 | 15 |
|  | 64 | 169 | 103 | 64 | 50 | 34 | 27 | 22 | 20 | 16 |
|  | 96 | 192 | 146 | 118 | 96 | 87 | 70 | 54 | 36 | 29 |
|  | 128 | 213 | 167 | 156 | 143 | 128 | 121 | 105 | 91 | 70 |
|  | 160 | 230 | 197 | 184 | 179 | 174 | 160 | 157 | 147 | 129 |
|  | 192 | 238 | 221 | 214 | 211 | 205 | 199 | 192 | 187 | 182 |
|  | 224 | 250 | 245 | 241 | 240 | 238 | 238 | 224 | 224 | 222 |
|  | 255 | 255 | 255 | 255 | 255 | 255 | 255 | 255 | 255 | 255 |

This image signal modification requires a storage such as a frame memory for storing the previous image signals. In addition, there may be a lookup table for storing a relation between a current image signal and the previous image signals.

Since the size of a lookup table that would include the modified image signals for all pairs of current and previous image signals may be massive, it is preferable, for example, that the modified image signals only for some pairs of current and previous image signals, like those shown in TABLE, are stored as reference modified signals and the modified image signals for remaining pairs of current and previous image signals are obtained by interpolation. The interpolation of a pair of current and previous image signals is done to determine the modified image signals for pairs of current and previous image signals and to calculate the modified signal for the signal pair based on the determined reference modified signals.

For example, each image signal that is a digital signal is divided into MSB (most significant bits) and LSB (least significant bits), and the reference modified signals for the pairs of previous and current image signals having zero LSB are stored in the lookup table. For a pair of previous and current image signals, some reference modified image signals associated with MSB of the signal pair are determined, and a modified image signal for the signal pair is calculated from LSB of the signal pair and the reference modified image signals determined from the lookup table.

An image signal modifier for the above-described signal modification according to an embodiment of the invention is described below with reference to FIG. 14.

Figure 14:
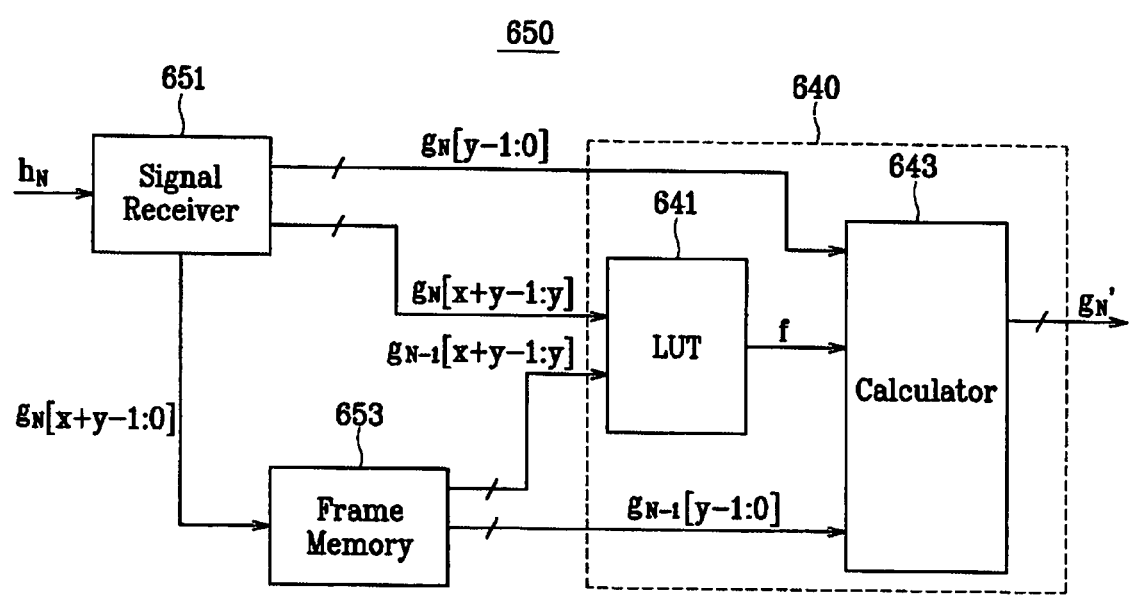
FIG. 14 is a block diagram of an image signal modifier according to an embodiment of the invention.

FIG. 14 is a block diagram of an image signal modifier. As shown in FIG. 14, an image signal modifier 650 includes a signal receiver 651, a frame memory 653 coupled with the signal receiver 651, and a signal converter 640 coupled with the signal receiver 651 and the frame memory 653. The image signal modifier 650 or the signal converter 640 may be incorporated into the signal controller 600 shown in FIG. 1, or implemented as a stand-alone device.

The signal receiver 651 receives an image signal $h_N$ of the N-th frame for a pixel PX and converts the image signal $h_N$ into an image signal $g_N$ that may be processed by the image signal modifier 650. The signal receiver 651 supplies the converted image signal $g_N$ to the frame memory 653 and the signal converter 640 as a current image signal.

The frame memory 653 supplies a stored image signal $g_{N-1}$ for the pixel PX to the signal converter 640 as a previous image signal, and stores the image signal $g_N$ received from the signal receiver 651.

The signal converter 640 includes a lookup table 641 coupled with the signal receiver 651 and the frame memory 653, and a calculator 643 coupled with the lookup table 641, the signal receiver 651, and the frame memory 653. The signal converter 640 obtains a modified image signal $g_N'$ for the current image signal $g_N$ according to the current image signal $g_N$ received from the signal receiver 651 and the previous image signal $g_{N-1}$ received from the frame memory 653.

The image signals $g_N$ and $g_{N-1}$ supplied from the signal receiver 651 and the frame memory 653, respectively, to the signal converter 640 are divided into MSB ($g_N[x+y-1:y]$ and $g_{N-1}[x+y-1:y]$) and LSB ($g_N[y-1:0]$ and $g_{N-1}[y-1:0]$). MSB ($g_N[x+y-1:y]$ and $g_{N-1}[x+y-1:y]$) are input into the lookup table 641, while LSB ($g_N[y-1:0]$ and $g_{N-1}[y-1:0]$) are input into the calculator 643.

The lookup table 641 stores reference modified image signals as described above, and outputs a set of reference modified image signals (f) associated with MSB ($g_N[x+y-1:y]$ and $g_{N-1}[x+y-1:y]$) of the current and the previous image signals $g_N$ and $g_{N-1}$.

The calculator 643 calculates the modified image signal $g_N'$ for the current image signal $g_N$ from the set of the reference modified image signals (f) and LSB ($g_N[y-1:0]$ and $g_{N-1}[y-1:0]$) of the previous and the current image signals $g_{N-1}$ and $g_N$ and outputs the modified image signal $g_N'$ to the data driver 500.

Thus, the data driver 500 of the image signal modifier applies a data voltage to the pixel PX, which is greater or less than a target data voltage.

The example shown above with respect to TABLE 1 does not modify a current image signal having the highest gray of 255 or the lowest gray of zero such that a target data voltage corresponding thereto is applied. However, it is preferable that a data voltage that is greater or less than the target voltage be applied unless the current image signal is not equal to a previous image signal.

For example, the gray voltages generated by the gray voltage generator 800 have a wider range than a range of target data voltages required for obtaining a desired range of light transmittance or a desired range of luminance represented by the grays of the input image signals R, G and B.

The highest gray voltage may be higher than the highest target data voltage and the lowest gray voltage may be lower than the lowest target data voltage. Alternatively, the highest gray voltage may be greater than the highest target data voltage, while the lowest gray voltage may be substantially equal to the lowest target data voltage. On the contrary, the lowest gray voltage may be smaller than the lowest target data voltage, while the highest gray voltage may be substantially equal to the highest target data voltage.

In this case, gray voltages for a predetermined range of grays fall within the range of the target data voltages, while gray voltages for the remaining grays fall outside of the range of the target data voltages.

It is assumed that an exemplary normally black mode LCD requires data voltages in a range from about 1V to about 4.5V to obtain a desired range of light transmittance and the common voltage Vcom is equal to 0V. The gray voltages having positive polarity may range from about 0V to about 6V and the gray voltages having negative polarity may range from about −6V to about 0V. When the number of the gray voltages having a positive polarity is equal to 256, the gray voltages for the 41-th gray to the 210-th gray may be in a range between about 1V and about 4.5V, which is the same as the range of the target data voltages, while the gray voltages for the 0-th gray to the 40-th gray may range from about 0V to about 1V, and the gray voltage for the 211-th gray to the 255-th gray may range from about 4.5V to about 6V.

Another exemplary LCD has positive gray voltages ranging from about 1V to about 6V and negative gray voltages ranging from about −6V to about −1V. For 256 gray-level positive gray voltages, the gray voltages for the 0-th gray to the 210-th gray may range from about 1V to about 4.5V, which is the same as the range of the target data voltages, while the gray voltages for the 211-th gray to the 255-th gray may range from about 4.5V to about 6V. For 64 gray levels, the gray voltages for the 0-th gray to the 56-th gray may be in a range that is equal to that of the target data voltages, while the gray voltages for the 57-th gray to the 64-th gray are greater that the target data voltages.

An LCD according to this embodiment uses the full range of the gray voltages for displaying motion images that have a large difference between current image signals and previous image signals, while a limited range of the gray voltages, i.e., the range of the target data voltages, for displaying still images that give little or no difference between current image signals and previous image signals. For example, the number of the gray voltages available to the still image is less than the total number of the gray voltages, however the number of the gray voltages available to the motion image is equal to the total number of the gray voltages.

The modification of image signals for the above-described gray voltage selection according to an embodiment of the present invention is described below with reference to FIG. 15. The image signal modification may be performed by the signal controller 600 shown in FIG. 1. However, the image signal modification may be performed by another image signal modifier.

Figure 15:
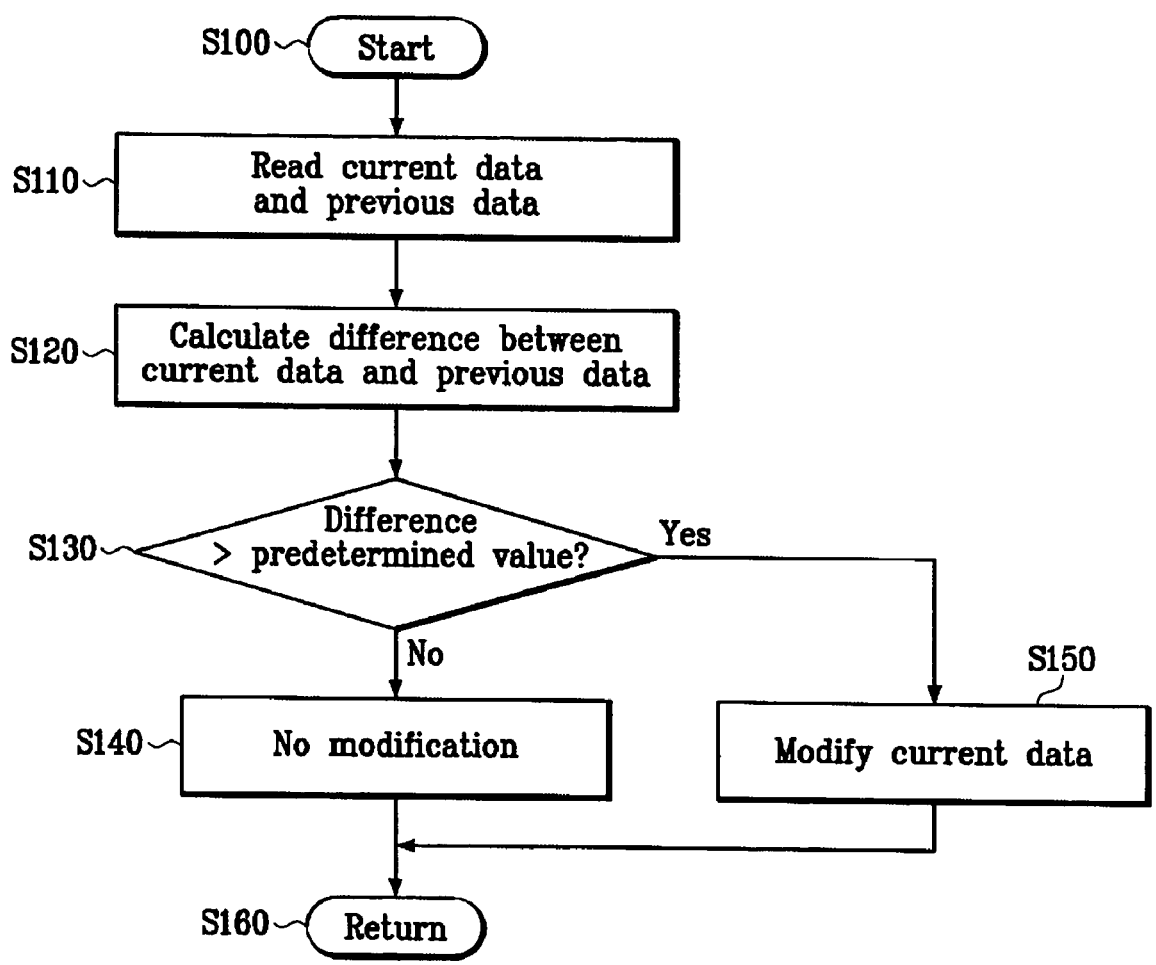
FIG. 15 is a flow chart showing the modification of the image signals according to an embodiment of the invention.

FIG. 15 is a flow chart showing the modification of the image signals according to an embodiment of the invention.

In operation 5100, at the start of the operation, digital image signals R, G and B ("image data") for one frame ("current data") are sequentially input into the signal controller 600. The signal controller 600 may include a frame memory that has stored therein digital image data for a previous frame ("previous data") and the input image data R, G and B.

In operation S110, the signal controller 600 reads a current data for a pixel PX input thereto and reads out a previous data for the pixel PX from the frame memory.

In operation S130, the signal controller 600 calculates the gray difference between the current data and the previous data and then compares the calculated gray difference with a predetermined value.

In operation S140, when the gray difference is larger than the predetermined value such that the pixel PX related to the image data displays a motion image, the signal controller 600 does not modify the current image data R, G and B.

The unmodified current data may be input into the image signal modifier 650 shown in FIG. 13 to be subject to DCC.

In operation S150, when the gray difference between the current data and the previous data is less than or equal to the predetermined value, e.g., when the gray difference is negligible such that the pixel PX displays a still image, the signal controller 600 modifies the current image data R, G and B and output the modified image data DAT.

Although the current data before modification may have the total range of the grays, the current data after modification may have the grays corresponding to the target data voltages.

For example, the 41-th to the 210-th gray voltages among total 256 gray voltages are in a range from about 1V to about 4.5V, which is the same as the range of the target data voltages, and the 0-th to the 40-th gray voltages and the 211-th to the 255-th gray voltages range from about 0V to about 1V and from about 4.5V to about 6V, respectively, as described above (for positive polarity). Since the image data for the pixels displaying motion images are not modified, the current data for the motion-image pixels, which are output from the signal controller 600, may include the entire range of grays, e.g., the 0-th to the 255-th grays. However, the signal controller 600 modifies the current data for the pixels displaying still images to have only the 41-th to the 210-th grays.

According to another example, the 0-th to the 210-th gray voltages from among a total of 256 gray voltages are in a range from about 1V to about 4.5V, which is equal to the range of the target data voltages, and the 211-th to the 255-th gray voltages range from about 4.5V to about 6V. In this case, the current data for the still-image pixels can have only the 0-th to the 210-th grays. Since the transition to a black gray requires a relatively short period of time to reach the target luminance as compared with the transition to a white gray, the target luminance is usually obtained in a given time with an applied voltage that is not less than the target data voltage.

For the latter case, methods of converting an input image signal having the 0-th to the 255-th gray into an output image signal having the 0-th to the 210-th gray for the still-image pixels are described below.

The modification of an input image data having the 0-th to the 255-th gray into an output image signal having the 0-th to the 210-th gray includes a mapping of the 0-th to the 255-th grays into the 0-th to the 210-th grays wherein the order of the grays is conserved. The order conservation requires the 0-th gray to be mapped into itself, e.g., the 0-th gray, and the 255-th gray to be mapped into the 210-th gray. The intermediate grays between the 0-th gray and the 255-th gray are mapped into the grays between the 0-th grays to the 210-th grays according to a predetermined rule.

The signal controller 600 may use a memory or a lookup table for storing a correspondence to be used for mapping the 0-th to the 255-th grays into the 0-th to the 210-th grays and provided therein or external thereto in order for an easier and faster modification. Alternatively, a separate calculator for calculating modified grays may be provided with the signal controller 600.

The mapping does not provide a one-to-one correspondence. For example, it is assumed that the 0-th to the 255-th grays are linearly mapped into the 0-th to the 210-th grays. For example, the x'-th gray for modified data for the x-th gray for input data is given by the relation x'=x×210/255. The gray of the modified data for the 20-th gray is 20×210/255= 16.47 . . . . Since a gray is represented as an integer, digits to the right of the decimal point may be dropped, raised, or rounded and the number 16.47 . . . . is converted into 16 or 17.

However, since the drop of the digits after the decimal point may result in an incorrect representation of the grays, spatial or temporal dithering is used. The spatial dithering represents the digits after the decimal point as an average gray of spatially adjacent pixels, while the temporal dithering represents the digits after the decimal point as a temporally-averaged gray of a pixel.

The data voltage applied to a pixel according to an embodiment of the invention is described below with reference to FIG. 16.

Figure 16:
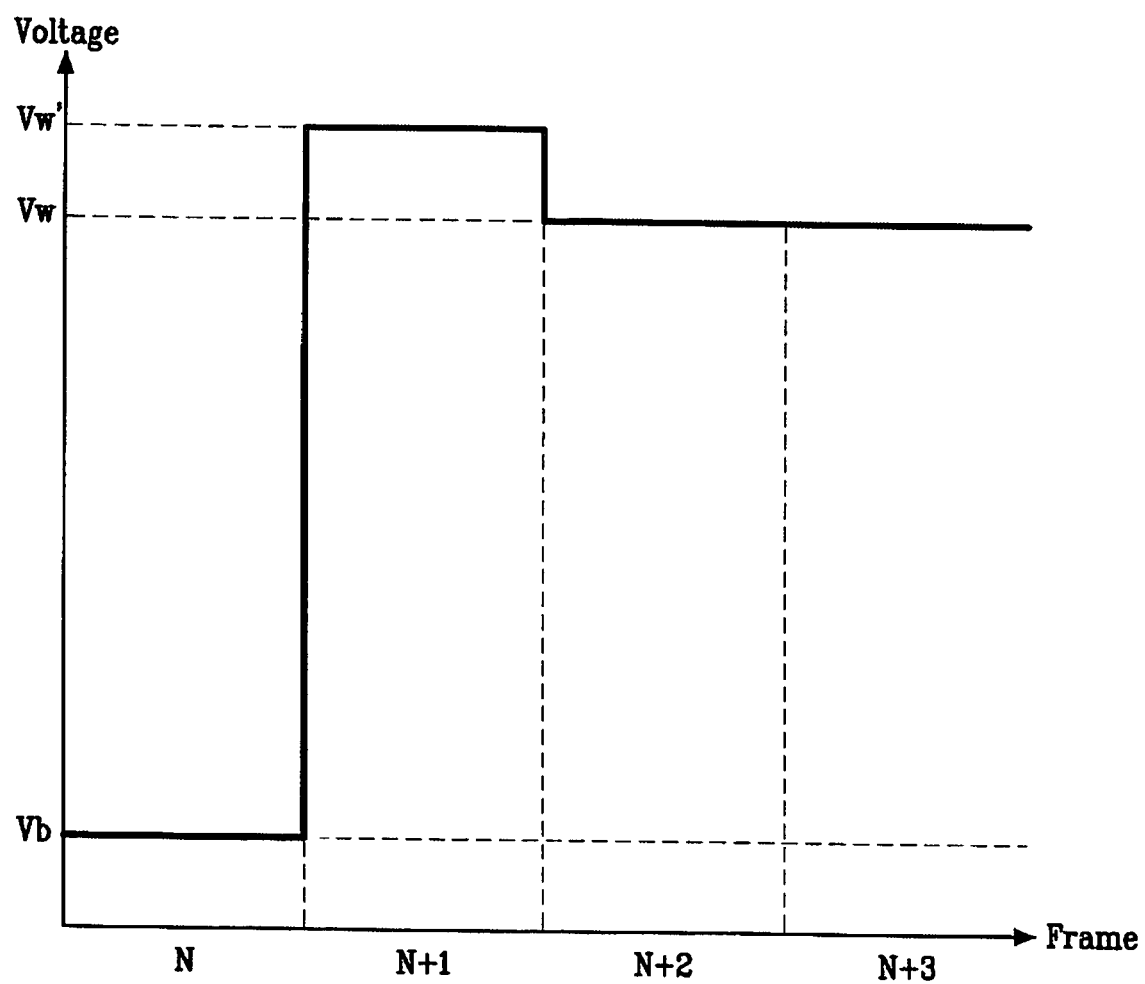
FIG. 16 is a graph showing the data voltage applied to a pixel as function of frame.

FIG. 16 is a graph showing the data voltage applied to a pixel as a function of a frame.

In FIG. 16, the gray of the input image signal for a pixel PX is equal to zero, i.e., the black gray, for the N-th frame and equal to 255, i.e., the white gray, for the (N+1)th and successive frames. Vb and Vw are target voltages for the black gray and the white gray, respectively, and Vw' is the gray voltage for the moving image.

The image signal of the (N+1)th frame is not modified and that the gray voltage Vw' for the 255-th gray is applied to the pixel PX because the difference in the image signals between the N-th frame and the (N+1)th frame is sufficiently large. Therefore, the gray voltage Vw' that is greater than the target data voltage Vw is applied to the pixel PX.

However, the image signals of the (N+2)th and successive frames are modified such that the target gray voltage Vw for the 255-th gray is applied to the pixel PX since there is no difference in the image signals between the successive frames. Therefore, the target data voltage Vw is applied to the pixel PX.

In this way, a pixel displaying motion images is supplied with a data voltage that is greater or less than a target data voltage to accelerate the charging of the LC capacitor $C_{LC}$ of a pixel, thereby obtaining the target luminance for a given period. This operation is applied to the entire grays including a black gray and a white gray to improve the charging of the LC capacitor $C_{LC}$.

A response time depending on the distance between the cutouts in the LCD shown in FIGS. 3, 4, 5, 6, 7, 8A, 8B, 9, 10, 11, 12, and 13 is described below with reference to FIG. 17.

Figure 17:
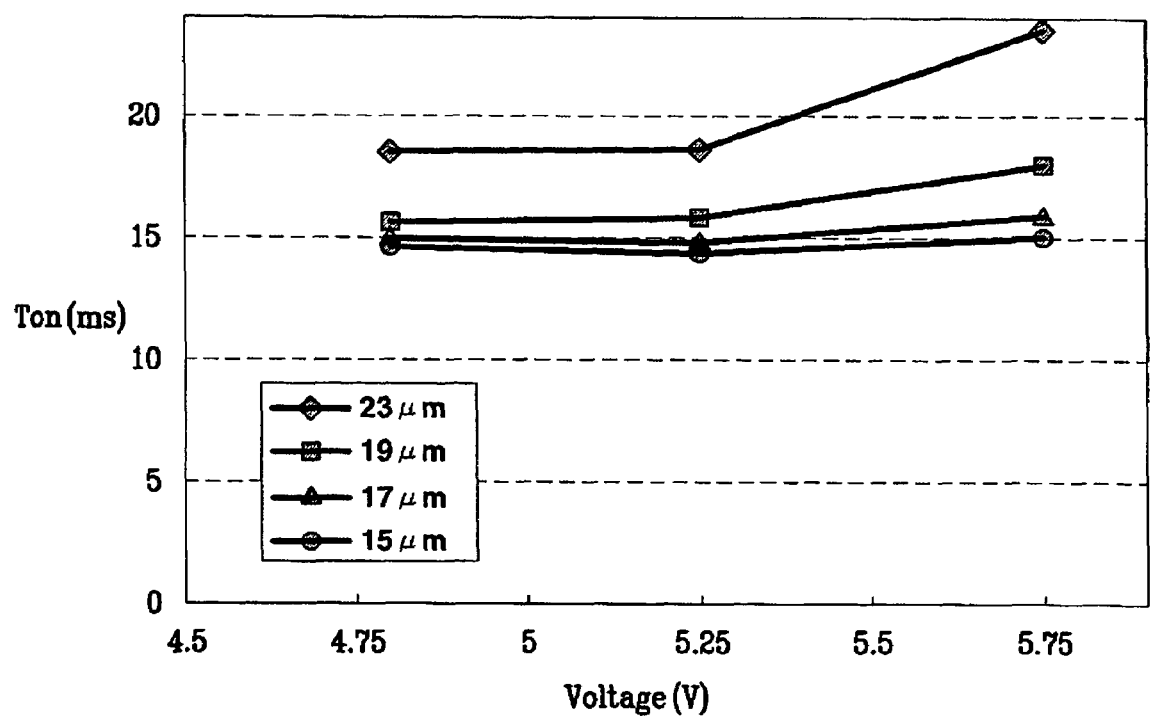
FIG. 17 is a graph showing the response time as function of the data voltage for various distance between the cutouts in an LCD according to an embodiment of the invention.

FIG. 17 is a graph illustrating the response time as function of the data voltage for various distance between the cutouts in an LCD according to an embodiment of the invention.

In FIG. 17, the horizontal axis represents the data voltage and the vertical axis represents the rising time Ton of the LC molecules.

The LCD used in the experiment is the LCD shown in FIGS. 3, 4, 5, 6, 7, 8A, 8B, 9, 10, 11, 12, and 13 and an experimented pixel was initially in a black state such that there was no electric field in the LC layer 3. The data voltages applied to the pixel in the initial state were equal to about 4.8V, about 5.25V, and about 5.75V, which were greater than a target voltage for obtaining a target luminance. The LCD was driven in a frame at a frequency of about 60 Hz. The rising time Ton for a given data voltage is defined as a time taken for a pixel to increase in luminance from of about 10% to about 90% of the target luminance.

As shown in FIG. 17, when the distance Wp or Wz between an edge of a pixel electrode 191 or an edge of a cutout 91, 92a or 92b of the pixel electrode 191 and an edge of a cutout 71, 72a, 72b, or 74 of a common electrode 270 adjacent thereto in the LCD shown in FIGS. 3, 4, 5, 6, 7, 8A, 8B, 9, 10, 11, 12, and 13 is about 15 microns to about 19 microns, the rising time Ton is about 14 ms to about 18 ms, and the variation of the rising time Ton due to the increase of the data voltage was not significant.

However, when the distance Wp and Wz was about 23 microns, the rising time Ton greatly increased as the data voltage increased such that the target transmittance might not be obtained at a given time.

The increase of the rising time Ton according to the increase of the data voltage may result from a vertical component of an electric field being generated in the LC layer 3 that is stronger than a horizontal component of the electric field, such that time increases for the LC molecules 31, in particular, those distant from the cutouts 91, 92a, and 92b and 71, 72a, 72b, 73, and 74 and from the edges of the pixel electrode 191, to determine the tilt directions. When the distance Wp and Wz is increased, the largest distance from the LC molecules to the cutouts 91, 92a, and 92b and 71, 72a, 72b, 73, and 74 or the edges of the pixel electrode 191 increases, which increases the rising time Ton.

According to the experiments, it is preferable that the distance Wp and Wz ranges from about 15 microns to about 20 microns, and more preferably, the distance Wp and Wz is equal to about 19 microns in consideration of the aperture ratio.

The response time depending on the data voltage for a given distance Wp and Wz between the cutouts is described below with reference to FIG. 18 and FIG. 19 and TABLE 2 and TABLE 3.

Figure 18:
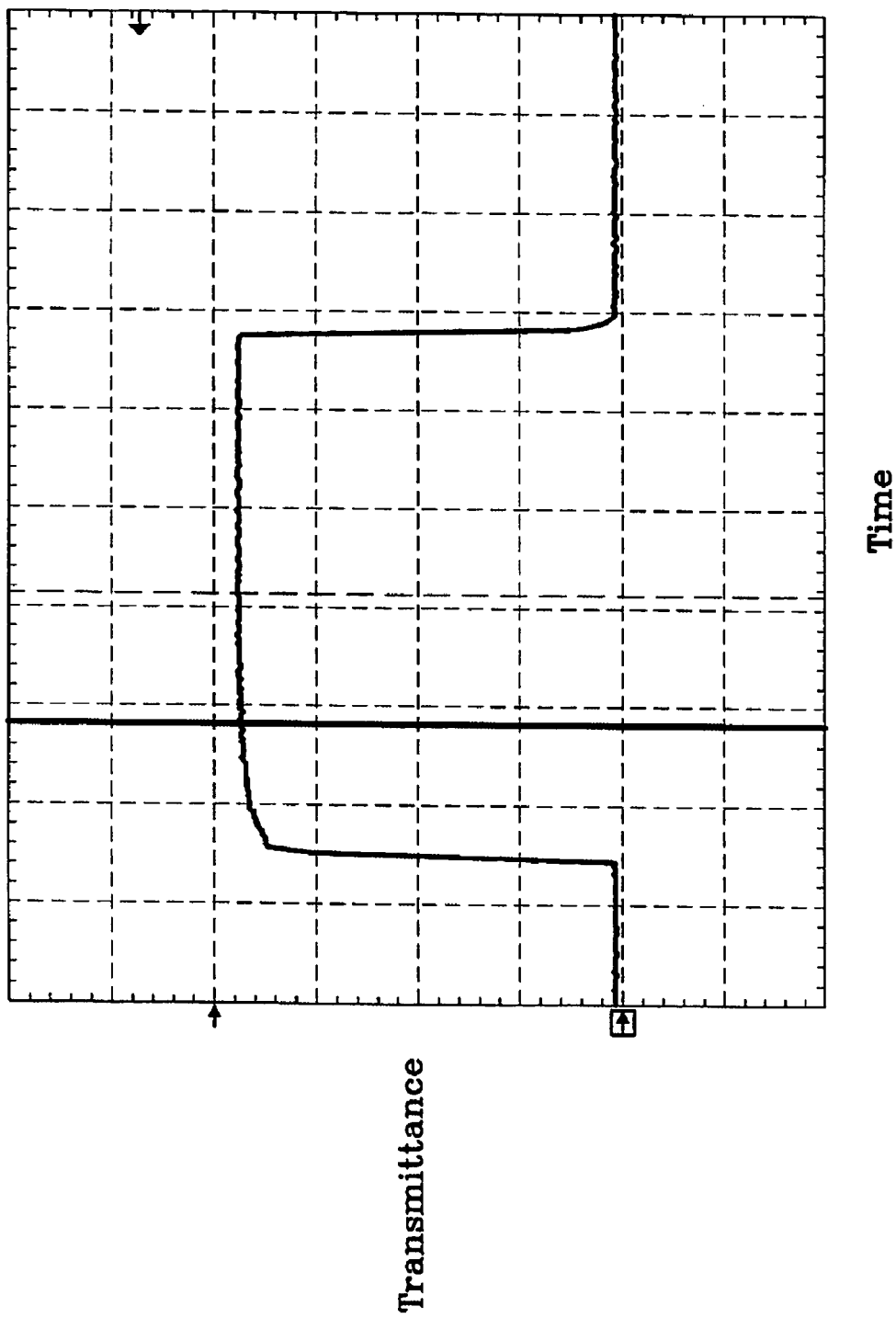
FIG. 18 shows the temporal variation of the luminance of a pixel in the LCD shown in FIGS. 3, 4, 5, 6, 7, 8A and 8B.
Figure 19:
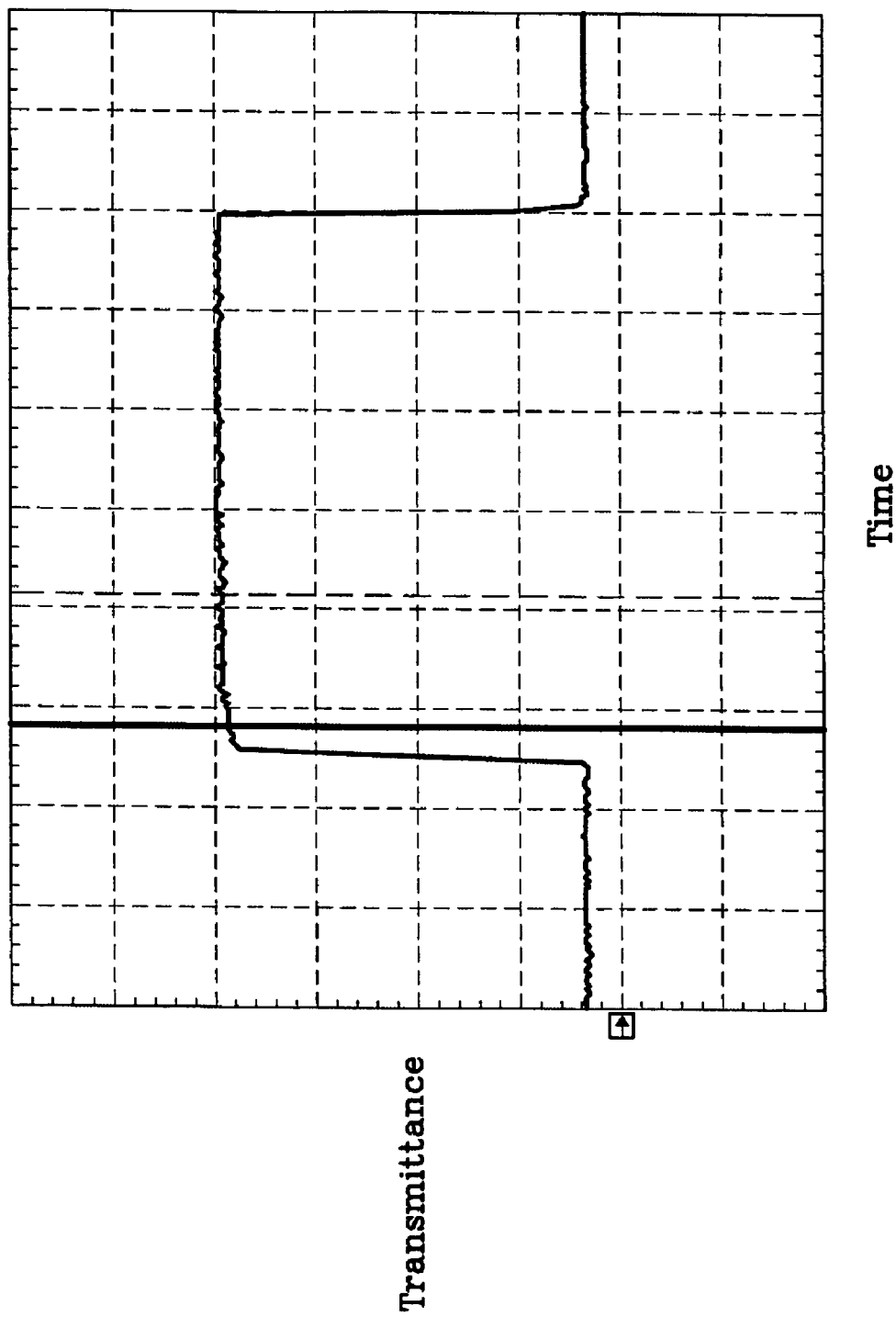
FIG. 19 shows the temporal variation of the luminance of a pixel in the LCD shown in FIGS. 9, 10, 11, 12, and 13.

FIG. 18 illustrates the temporal variation of the luminance of a pixel in the LCD shown in FIGS. 3, 4, 5, 6, 7, 8A, and 8B. FIG. 19 illustrates the temporal variation of the luminance of a pixel in the LCD shown in FIGS. 9, 10, 11, 12, and 13.

The distance Wp and Wz between the cutouts in the experimented LCDs is about 17.5 microns. The gray of the input image signal $g_{N-1}$ in the first frame is zero and the applied data voltage is about 0V. For the grays of (1)-(8) of the input image signal $g_N$ in the second frame, which are close to the white gray (the 255-th gray), the gray of the modified image signal $g_N'$ was 255.

TABLE 2

|  | $g_{N-1}$ | | $g_N$ | | $g_N'$ | | Overshoot | |
| --- | --- | --- | --- | --- | --- | --- | --- | --- |
|  | Gray | Voltage (V) | Gray | Voltage (V) | Gray | Voltage (V) | Voltage (V) | Tons (ms) |
| (1) | 0 | 0 | 245 | 5.5 | 255 | 6 | 0.5 | 13.48 |
| (2) | 0 | 0 | 243 | 5.25 | 255 | 6 | 0.75 | 12.4 |
| (3) | 0 | 0 | 241 | 5.1 | 255 | 6 | 0.9 | 11.4 |
| (4) | 0 | 0 | 239 | 5 | 255 | 6 | 1 | 10.5 |

TABLE 3

| | $g_{N-1}$ | | $g_N$ | | $g_N'$ | | Overshoot | |
|---|---|---|---|---|---|---|---|---|
| | Gray | Voltage (V) | Gray | Voltage (V) | Gray | Voltage (V) | Voltage (V) | Ton (ms) |
| (4) | 0 | 0 | 250 | 5.5 | 255 | 5.95 | 0.45 | 12.63 |
| (6) | 0 | 0 | 247 | 5.25 | 255 | 5.95 | 0.7 | 10 |
| (7) | 0 | 0 | 243 | 5.0 | 255 | 5.95 | 0.95 | 8.95 |
| (8) | 0 | 0 | 240 | 4.85 | 255 | 5.95 | 1.1 | 7.82 |

As shown in TABLE 2 and TABLE 3, the response time Ton decreases as the overshoot voltage, which is the difference between the applied voltage and the target voltage, increases. The response time Ton for the case (4) was about 10.5 ms and that for the case (8) was about 7.82 ms. The temporal variations of the luminance for the cases (4) and (8) are shown in FIG. 18 and FIG. 19, respectively.

Based on the experiments, the overshoot voltage from the black gray to the white gray is preferably lower than about 1.5V, and more preferably, the overshoot voltage is between about 0.8V to about 1.5V.

The experiments also teach that the modification of the image signals based only on the previous signals are sufficient to obtain an appropriate response time and a pre-tilt for pre-tilting the LC molecules for shorter response time is not necessary, which is complex and requires increased time and cost.

Accordingly, the distance between the cutouts is preferably in a range of about 15 to about 20 microns, for the LCD driven by DCC.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD), comprising:
   a first substrate;
   a first signal line and a second signal line arranged on the first substrate, the second signal line intersecting the first signal line;
   a thin film transistor coupled with the first signal line and the second signal line;
   a pixel electrode coupled with the thin film transistor;
   a second substrate facing the first substrate;
   a common electrode arranged on the second substrate;
   a liquid crystal layer arranged between the first substrate and the second substrate;
   a first tilt direction determining member and a second tilt direction determining member arranged on the first substrate;
   wherein the first tilt direction determining member is about 15 microns to about 20 microns apart from the second tilt direction determining member.

2. The LCD of claim 1, wherein the first tilt direction determining member comprises a first cutout provided at the pixel electrode or an edge portion of the pixel electrode, and the second tilt direction determining member comprises a second cutout provided at the common electrode.

3. The LCD of claim 2, wherein the first cutout forms an oblique angle relative to a first edge of the pixel electrode.

4. The LCD of claim 3, wherein the first cutout comprises an end portion having a plurality of oblique projections relative to the first edge of the pixel electrode.

5. The LCD of claim 4, wherein the projections form an angle of about 45 degrees relative to the first edge of the pixel electrode.

6. The LCD of claim 2, wherein the first cutout or the second cutout comprises an end portion extending parallel to the second signal line and having an oblique edge relative to the second signal line.

7. The LCD of claim 6, wherein an edge of the end portion of the first cutout or the second cutout forms an angle of about 45 degrees relative to the second signal line.

8. The LCD of claim 2, wherein the second cutout has an end portion extending substantially parallel to a first edge of the pixel electrode and overlapping the first edge of the pixel electrode.

9. The LCD of claim 8, wherein the end portion of the second cutout comprises an oblique edge relative to the first edge of the pixel electrode.

10. The LCD of claim 8, wherein the end portion of the second cutout comprises a plurality of projections, the end portion of the second cutout having an oblique edge relative to the first edge of the pixel electrode.

11. The LCD of claim 1, wherein the first tilt direction determining member comprises an edge portion of the pixel electrode, and the second tilt direction determining member comprises a cutout provided at the common electrode.

12. The LCD of claim 11, wherein the cutout extends substantially parallel to the edge portion of the pixel electrode.

13. The LCD of claim 12, wherein the edge portion of the pixel electrode is curved.

14. The LCD of claim 13, wherein the second signal line is curved along the curved edge portion of the pixel electrode.

15. The LCD of claim 1, further comprising:
   an image signal modifier modifying an input image signal having luminance information according to a previous image signal such that a difference between the modified image signal and the previous image signal is larger than a difference between the input image signal and the previous image signal; and
   a data driver converting the modified image signal into a data voltage that is applied to the second signal line.

16. The LCD of claim 15, further comprising:
   a gray voltage generator generating a plurality of gray voltages to be transmitted to the data driver, the gray voltages being selected as the data voltage.

17. The LCD of claim 16, wherein a range of the gray voltages is greater than a range of target voltages for obtaining target luminance.

18. The LCD of claim 17, wherein a highest gray voltage is greater than a highest target voltage for obtaining a highest target luminance.

19. A liquid crystal display (LCD), comprising:
   a first substrate;
   a gate line arranged on the first substrate;
   a gate insulating layer arranged on the gate line;
   a semiconductor layer arranged on the gate insulating layer;
   a data line arranged on the gate insulating layer, the data line including a portion arranged on the semiconductor layer;
   a drain electrode arranged on the semiconductor layer and separated from the data line;
   a pixel electrode coupled with the drain electrode, the pixel electrode having a first cutout;

a second substrate facing the first substrate; and
a common electrode arranged on the second substrate, the common electrode having a second cutout,
wherein the first cutout is about 15 microns to about 20 microns apart from the second cutout.

20. The LCD of claim 19, further comprising:
an image signal modifier modifying an input image signal having luminance information according to a previous image signal such that a difference between the modified image signal and the previous image signal is greater than a difference between the input image signal and the previous image signal; and
a data driver converting the modified image signal into a data voltage that is applied to the data line.

* * * * *